United States Patent
Engi et al.

(10) Patent No.: US 12,149,410 B2
(45) Date of Patent: *Nov. 19, 2024

(54) AUTOMATED GENERATION OF STANDARD NETWORK DEVICE CONFIGURATIONS

(71) Applicant: Cisco Technology, Inc., San Jose, CA (US)

(72) Inventors: Derek William Engi, Ferndale, MI (US); Gonzalo Salgueiro, Raleigh, NC (US); M. David Hanes, Lewisville, NC (US); Bradley Wise, Sunnyvale, CA (US); Md Atiqur Rahman, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,209

(22) Filed: Jun. 27, 2022

(65) Prior Publication Data
US 2022/0329488 A1    Oct. 13, 2022

Related U.S. Application Data

(63) Continuation of application No. 17/164,339, filed on Feb. 1, 2021, now Pat. No. 11,418,397.

(51) Int. Cl.
*H04L 41/08*        (2022.01)
*G06N 20/00*        (2019.01)
(Continued)

(52) U.S. Cl.
CPC ......... *H04L 41/0876* (2013.01); *G06N 20/00* (2019.01); *H04L 41/0893* (2013.01);
(Continued)

(58) Field of Classification Search
CPC ............ H04L 41/0876; H04L 41/0893; H04L 41/0889; H04L 43/16
See application file for complete search history.

(56) References Cited

U.S. PATENT DOCUMENTS

| | | | |
|---|---|---|---|
| 6,996,601 B1 * | 2/2006 | Smith | G06Q 10/06 715/762 |
| 9,037,464 B1 | 5/2015 | Mikolov et al. | |

(Continued)

OTHER PUBLICATIONS

Tomas Mikolov et al., "Distributed Representations of Words and Phrases and their Compositionality", arXiv:1310.4546v1 [cs.CL], Oct. 16, 2013, 9 pages.

(Continued)

*Primary Examiner* — Nam T Tran
(74) *Attorney, Agent, or Firm* — Edell, Shapiro & Finnan, LLC

(57) ABSTRACT

Techniques described herein relate to automatically generating standard network device configurations. In one example, one or more groups of network device configuration blocks may be obtained. An analysis of the one or more groups of network device configuration blocks may be performed, including identifying respective frequencies associated with respective network device configuration blocks of the one or more groups of network device configuration blocks. Based on the respective frequencies, one or more network device configuration blocks of the one or more groups of network device configuration blocks may be automatically aggregated into a standard network device configuration.

22 Claims, 14 Drawing Sheets

(51) Int. Cl.
*H04L 41/0893* (2022.01)
*H04L 41/14* (2022.01)
*H04L 41/16* (2022.01)
*H04L 43/16* (2022.01)

(52) U.S. Cl.
CPC .............. *H04L 41/14* (2013.01); *H04L 41/16* (2013.01); *H04L 43/16* (2013.01)

(56) References Cited

U.S. PATENT DOCUMENTS

| | | | |
|---|---|---|---|
| 9,454,616 | B2* | 9/2016 | Baikov ................ G06F 9/54 |
| 10,122,577 | B1 | 11/2018 | Rykowski et al. |
| 10,122,872 | B1* | 11/2018 | Shin .................... H04L 41/0893 |
| 10,277,461 | B1 | 4/2019 | A et al. |
| 10,462,010 | B2 | 10/2019 | Bevemyr et al. |
| 10,469,307 | B2 | 11/2019 | Nucci et al. |
| 2006/0036736 | A1* | 2/2006 | Kitamura ............ H04L 41/0893 709/226 |
| 2009/0049290 | A1 | 2/2009 | Benhase et al. |
| 2014/0095677 | A1* | 4/2014 | Croy ................... H04L 41/0893 709/220 |
| 2015/0128267 | A1 | 5/2015 | Gupta et al. |
| 2016/0080204 | A1* | 3/2016 | Mishra ................ H04L 41/0853 709/220 |
| 2016/0149771 | A1 | 5/2016 | Prasad et al. |
| 2016/0352572 | A1 | 12/2016 | Mishra et al. |
| 2016/0359914 | A1* | 12/2016 | Deen ................... H04L 67/01 |
| 2017/0163485 | A1 | 6/2017 | Rokui et al. |
| 2017/0207980 | A1* | 7/2017 | Hudis .................. H04L 67/34 |
| 2017/0318128 | A1 | 11/2017 | Ananthanarayanan et al. |
| 2018/0253487 | A1* | 9/2018 | Carteri ................ G06Q 30/016 |
| 2018/0314956 | A1 | 11/2018 | Biswas et al. |
| 2019/0253437 | A1 | 8/2019 | Barak et al. |
| 2019/0303469 | A1 | 10/2019 | Makovsky et al. |
| 2019/0306023 | A1 | 10/2019 | Vasseur et al. |
| 2020/0007381 | A1 | 1/2020 | Nucci et al. |
| 2020/0076837 | A1 | 3/2020 | Ladnai et al. |

OTHER PUBLICATIONS

Tomas Mikolov et al., "Efficient Estimation of Word Representations in Vector Space", arXiv:1301.3781v3 [cs.CL], Sep. 7, 2013, 12 pages.
Jay Johnston et al., "Visualizing a Network Connection's Overall Health and Providing Actionable Information", Cisco Systems, Inc., Nov. 1, 2012, 9 pages.
Xinjun Zhang et al., "Measuring and Visualizing User Sentiment Changes Over Multiple Channels", Technical Disclosure Commons, Oct. 24, 2019, 7 pages.
Clarabridge, "What is Intelligent Scoring?", retrieved from Internet Jan. 15, 2021, 9 pages.
SAS office, "How can we use promoter scores to understand ROI?", 2014, 2 pages.
Cisco, "Release Notes for Cisco Pulse Release 1.0.5", May 17, 2010, 16 pages.
Cisco, "Cisco Pulse API Reference Guide", May 2010, 200 pages.
Cisco, "Cisco Pulse Administrator Guide", May 2010, 270 pages.
Cisco, "Cisco Pulse User Guide", May 2010, 150 pages.
Byron Dom et al., "Graph-Based Ranking Algorithms for Email Expertise Analysis", DMKD'03, Jun. 13, 2003, 8 pages.
Christopher S. Campbell et al., "Expertise Identification using Email Communications", CIKM'03, Nov. 3-8, 2003, 5 pages.
Jun Zhang et al., "Searching For Expertise in Social Networks: A Simulation of Potential Strategies", Group'05, Nov. 6-9, 2005, 10 pages.
Ching-Yung Lin et al., "SmallBlue: Social Network Analysis for Expertise Search and Collective Intelligence", IEEE International Conference on Data Engineering, retrieved from Internet Jan. 15, 2021, 4 pages.
Michael D. Lee et al., "A Model-Based Approach to Measuring Expertise in Ranking Tasks", retrieved from Internet Jan. 15, 2021, 6 pages.
Cisco, "Create Templates to Automate Device Configuration Changes", retrieved from Internet Jan. 15, 2021, 12 pages.
Cisco, "Managing Multiple Networks with Configuration Templates", Meraki, retrieved from Internet Jan. 15, 2021, 11 pages.
Anuta Networks, "Multi-Vendor Network Compliance Management", 2020, 12 pages.
Yoan Chabot et al., "A complete formalized knowledge representation model for advanced digital forensics timeline analysis", retrieved from Internet Jan. 15, 2021, 11 pages.
Doantam Phan, "Supporting the Visualization and Forensic Analysis of Network Events", Stanford University, Dec. 2007, 128 pages.
Ca, "Network Fault Manager", Sep. 2008, 18 pages.
ManageEngine, "Network Change Monitoring", retrieved from Internet Jan. 15, 2021, 7 pages.
Solarwinds, "Network Configuration Change Management", retrieved from Internet Jan. 15, 2021, 6 pages.
Cisco, "Create Templates to Automate Device Configuration Changes", retrieved from Internet Jan. 15, 2021, 64 pages.
Talwadker, et al., "PopCon: Mining Popular Software Configurations from Community," 2019 ACM/IEEE International Symposium on Empirical Software Engineering and Measurement (ESEM), Sep. 2019, 6 pages.

* cited by examiner

| | | | | | | | | |
|---|---|---|---|---|---|---|---|---|
| Oct 6 10:47:26 | 172.17.0.1 | deengi | tty0 | async | stop | task_id=1 | timezone=EET | service=shell | priv-lvl=0 | cmd=enable <cr> |
| Oct 6 10:48:35 | 172.17.0.1 | deengi | tty0 | async | stop | task_id=2 | timezone=EET | service=shell | priv-lvl=15 | cmd=write memory <cr> |
| Oct 6 10:48:38 | 172.17.0.1 | deengi | tty0 | async | stop | task_id=3 | timezone=EET | service=shell | priv-lvl=0 | cmd=exit <cr> |
| Oct 6 10:48:52 | 172.17.0.1 | deengi | tty0 | async | stop | task_id=5 | timezone=EET | service=shell | priv-lvl=0 | cmd=enable <cr> |
| Oct 6 10:48:56 | 172.17.0.1 | deengi | tty0 | async | stop | task_id=6 | timezone=EET | service=shell | priv-lvl=15 | cmd=configure terminal <cr> |
| Oct 6 10:49:01 | 172.17.0.1 | deengi | tty0 | async | stop | task_id=7 | timezone=EET | service=shell | priv-lvl=15 | cmd=interface Ethernet 0 2 <cr> |
| Oct 6 10:49:09 | 172.17.0.1 | deengi | tty0 | async | stop | task_id=8 | timezone=EET | service=shell | priv-lvl=15 | cmd=description Cloud connect <cr> |
| Oct 6 10:49:20 | 172.17.0.1 | deengi | tty0 | async | stop | task_id=9 | timezone=EET | service=shell | priv-lvl=15 | cmd=interface Ethernet 0 0 <cr> |
| Oct 6 10:49:54 | 172.17.0.1 | deengi | tty0 | async | stop | task_id=10 | timezone=EET | service=shell | priv-lvl=15 | cmd=ip address 10.1.0.1 255.255.255.252 <cr> |
| Oct 6 10:49:55 | 172.17.0.1 | deengi | tty0 | async | stop | task_id=11 | timezone=EET | service=shell | priv-lvl=15 | cmd=no shutdown <cr> |
| Oct 6 10:50:02 | 172.17.0.1 | deengi | tty0 | async | stop | task_id=12 | timezone=EET | service=shell | priv-lvl=15 | cmd=ip ospf 1 area 10 <cr> |
| Oct 6 10:50:28 | 172.17.0.1 | deengi | tty0 | async | stop | task_id=13 | timezone=EET | service=shell | priv-lvl=15 | cmd=description Link to agg-1-9300-a <cr> |
| Oct 6 10:50:40 | 172.17.0.1 | deengi | tty0 | async | stop | task_id=14 | timezone=EET | service=shell | priv-lvl=15 | cmd=duplex full <cr> |
| Oct 6 10:52:29 | 172.17.0.1 | deengi | tty0 | async | stop | task_id=15 | timezone=EET | service=shell | priv-lvl=15 | cmd=show running-config <cr> |
| Oct 6 10:52:33 | 172.17.0.1 | deengi | tty0 | async | stop | task_id=16 | timezone=EET | service=shell | priv-lvl=15 | cmd=configure terminal <cr> |
| Oct 6 10:52:49 | 172.17.0.1 | deengi | tty0 | async | stop | task_id=17 | timezone=EET | service=shell | priv-lvl=15 | cmd=logging host 192.168.63.1 <cr> |
| Oct 6 10:53:24 | 172.17.0.1 | deengi | tty0 | async | stop | task_id=18 | timezone=EET | service=shell | priv-lvl=15 | cmd=snmp-server community * ro 99 <cr> |
| Oct 6 10:53:32 | 172.17.0.1 | deengi | tty0 | async | stop | task_id=19 | timezone=EET | service=shell | priv-lvl=15 | cmd=ip access-list standard 99 <cr> |
| Oct 6 10:53:58 | 172.17.0.1 | deengi | tty0 | async | stop | task_id=20 | timezone=EET | service=shell | priv-lvl=15 | cmd=remark Netmgmt workstations <cr> |
| Oct 6 10:54:09 | 172.17.0.1 | deengi | tty0 | async | stop | task_id=21 | timezone=EET | service=shell | priv-lvl=15 | cmd=permit 10.254.1.0 0.0.0.255 log <cr> |
| Oct 6 10:54:11 | 172.17.0.1 | deengi | tty0 | async | stop | task_id=22 | timezone=EET | service=shell | priv-lvl=15 | cmd=write memory <cr> |

| Date/Time | IP | User | tty | mode | action | task_id | timezone | service | priv-lvl | cmd | |
|---|---|---|---|---|---|---|---|---|---|---|---|
| Oct 6 11:31:59 | 172.17.0.1 | deengj | tty0 | async | stop | task_id=13 | timezone=EET | service=shell | priv-lvl=15 | cmd=interface Ethernet 0 1 <cr> | |
| Oct 6 11:32:11 | 172.17.0.1 | deengj | tty0 | async | stop | task_id=14 | timezone=EET | service=shell | priv-lvl=15 | cmd=service-policy input LAN-QoS-IN <cr> | |
| Oct 6 11:32:18 | 172.17.0.1 | deengj | tty0 | async | stop | task_id=15 | timezone=EET | service=shell | priv-lvl=0 | cmd=exit <cr> | |
| Oct 6 11:32:21 | 172.17.0.1 | deengj | tty0 | async | stop | task_id=19 | timezone=EET | service=shell | priv-lvl=15 | cmd=default switchport voice vlan <cr> | |
| Oct 6 11:32:21 | 172.17.0.1 | deengj | tty0 | async | stop | task_id=18 | timezone=EET | service=shell | priv-lvl=15 | cmd=default service-policy input LAN-QoS-IN <cr> | |
| Oct 6 11:32:21 | 172.17.0.1 | deengj | tty0 | async | stop | task_id=16 | timezone=EET | service=shell | priv-lvl=15 | cmd=default interface Ethernet 0 1 <cr> | |
| Oct 6 11:32:21 | 172.17.0.1 | deengj | tty0 | async | stop | task_id=21 | timezone=EET | service=shell | priv-lvl=15 | cmd=default switchport access vlan <cr> | |
| Oct 6 11:32:21 | 172.17.0.1 | deengj | tty0 | async | stop | task_id=22 | timezone=EET | service=shell | priv-lvl=0 | cmd=end <cr> | |
| Oct 6 11:32:21 | 172.17.0.1 | deengj | tty0 | async | stop | task_id=17 | timezone=EET | service=shell | priv-lvl=15 | cmd=interface Ethernet 0 1 <cr> | |
| Oct 6 11:32:21 | 172.17.0.1 | deengj | tty0 | async | stop | task_id=20 | timezone=EET | service=shell | priv-lvl=15 | cmd=default switchport mode <cr> | 310(1) |
| Oct 6 11:32:30 | 172.17.0.1 | deengj | tty0 | async | stop | task_id=23 | timezone=EET | service=shell | priv-lvl=15 | cmd=interface Ethernet 0 1 <cr> | |
| Oct 6 11:32:32 | 172.17.0.1 | deengj | tty0 | async | stop | task_id=24 | timezone=EET | service=shell | priv-lvl=15 | cmd=switchport <cr> | |
| Oct 6 11:32:34 | 172.17.0.1 | deengj | tty0 | async | stop | task_id=25 | timezone=EET | service=shell | priv-lvl=15 | cmd=switchport mode access <cr> | |
| Oct 6 11:32:38 | 172.17.0.1 | deengj | tty0 | async | stop | task_id=26 | timezone=EET | service=shell | priv-lvl=15 | cmd=switchport access vlan 101 <cr> | |
| Oct 6 11:32:45 | 172.17.0.1 | deengj | tty0 | async | stop | task_id=27 | timezone=EET | service=shell | priv-lvl=15 | cmd=switchport voice vlan 201 <cr> | |
| Oct 6 11:32:55 | 172.17.0.1 | deengj | tty0 | async | stop | task_id=28 | timezone=EET | service=shell | priv-lvl=15 | cmd=duplex full <cr> | |
| Oct 6 11:33:08 | 172.17.0.1 | deengj | tty0 | async | stop | task_id=29 | timezone=EET | service=shell | priv-lvl=15 | cmd=description RTP-103-Off-A <cr> | |
| Oct 6 11:33:18 | 172.17.0.1 | deengj | tty0 | async | stop | task_id=30 | timezone=EET | service=shell | priv-lvl=15 | cmd=service-policy input LAN-QoS-IN <cr> | |
| Oct 6 11:33:34 | 172.17.0.1 | deengj | tty0 | async | stop | task_id=31 | timezone=EET | service=shell | priv-lvl=15 | cmd=interface Ethernet 0 2 <cr> | 310(2) |
| Oct 6 11:33:35 | 172.17.0.1 | deengj | tty0 | async | stop | task_id=32 | timezone=EET | service=shell | priv-lvl=15 | cmd=switchport <cr> | |
| Oct 6 11:33:37 | 172.17.0.1 | deengj | tty0 | async | stop | task_id=33 | timezone=EET | service=shell | priv-lvl=15 | cmd=switchport mode access <cr> | |
| Oct 6 11:33:39 | 172.17.0.1 | deengj | tty0 | async | stop | task_id=34 | timezone=EET | service=shell | priv-lvl=15 | cmd=switchport access vlan 101 <cr> | |
| Oct 6 11:33:44 | 172.17.0.1 | deengj | tty0 | async | stop | task_id=35 | timezone=EET | service=shell | priv-lvl=15 | cmd=switchport voice vlan 201 <cr> | |
| Oct 6 11:33:53 | 172.17.0.1 | deengj | tty0 | async | stop | task_id=36 | timezone=EET | service=shell | priv-lvl=15 | cmd=description RTP-103-Off-B <cr> | |
| Oct 6 11:34:03 | 172.17.0.1 | deengj | tty0 | async | stop | task_id=37 | timezone=EET | service=shell | priv-lvl=15 | cmd=service-policy input LAN-QoS-IN <cr> | |
| Oct 6 11:34:09 | 172.17.0.1 | deengj | tty0 | async | stop | task_id=38 | timezone=EET | service=shell | priv-lvl=15 | cmd=interface Ethernet 0 3 <cr> | 310(3) |
| Oct 6 11:34:10 | 172.17.0.1 | deengj | tty0 | async | stop | task_id=39 | timezone=EET | service=shell | priv-lvl=15 | cmd=switchport <cr> | |
| Oct 6 11:34:12 | 172.17.0.1 | deengj | tty0 | async | stop | task_id=40 | timezone=EET | service=shell | priv-lvl=15 | cmd=switchport mode access <cr> | |
| Oct 6 11:34:16 | 172.17.0.1 | deengj | tty0 | async | stop | task_id=41 | timezone=EET | service=shell | priv-lvl=15 | cmd=switchport access vlan 101 <cr> | |
| Oct 6 11:34:22 | 172.17.0.1 | deengj | tty0 | async | stop | task_id=42 | timezone=EET | service=shell | priv-lvl=15 | cmd=switchport voice vlan 201 <cr> | |
| Oct 6 11:34:31 | 172.17.0.1 | deengj | tty0 | async | stop | task_id=43 | timezone=EET | service=shell | priv-lvl=15 | cmd=description RTP-103-Off-C2 <cr> | |
| Oct 6 11:34:39 | 172.17.0.1 | deengj | tty0 | async | stop | task_id=44 | timezone=EET | service=shell | priv-lvl=15 | cmd=service-policy input LAN-QoS-IN <cr> | |
| Oct 6 11:34:47 | 172.17.0.1 | deengj | tty0 | async | stop | task_id=45 | timezone=EET | service=shell | priv-lvl=15 | cmd=write memory <cr> | |

FIG.3

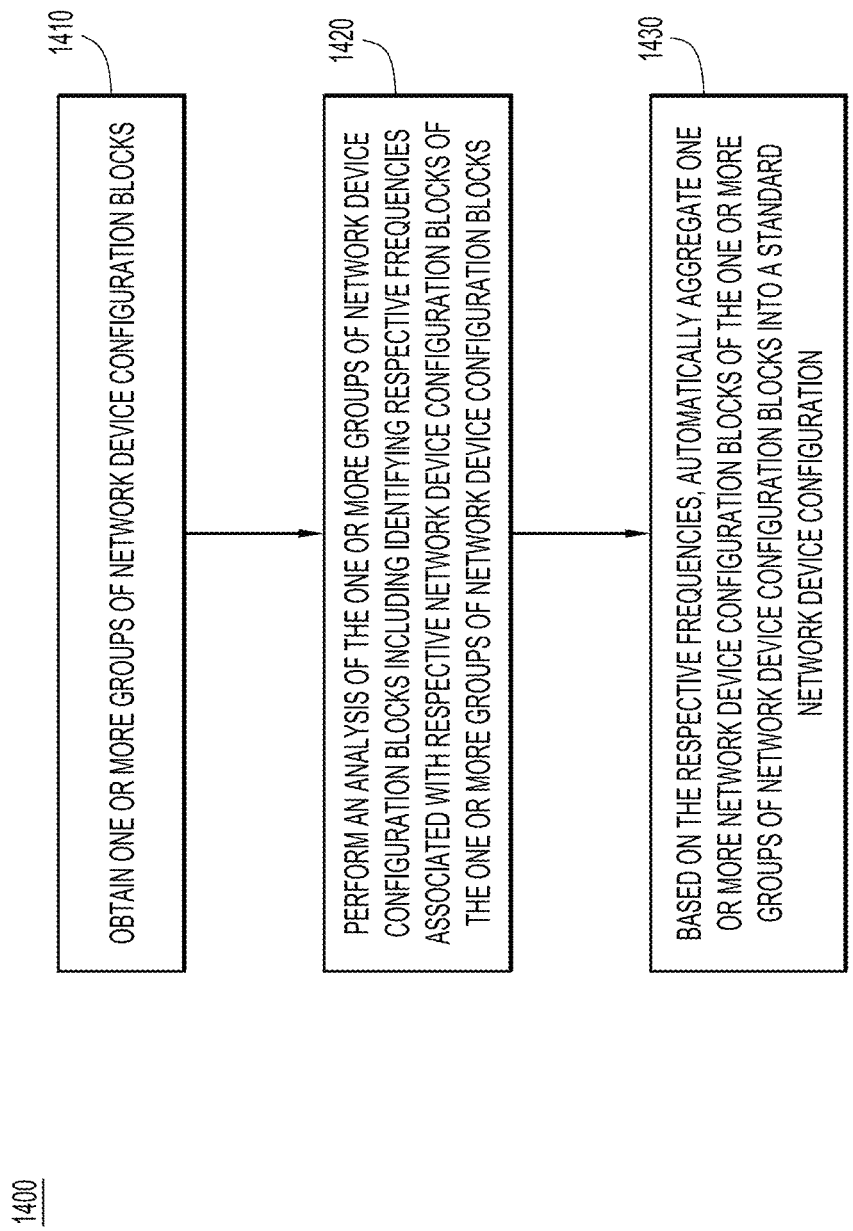

AUTOMATED GENERATION OF STANDARD NETWORK DEVICE CONFIGURATIONS

CROSS REFERENCE TO RELATED APPLICATION

This application is a continuation of U.S. application Ser. No. 17/164,339, filed Feb. 1, 2021, the entirety of which is incorporated herein by reference.

TECHNICAL FIELD

The present disclosure relates to computer networking.

BACKGROUND

"Golden templates" in the context of network equipment can include certified and standardized network device configurations that can be securely applied to one or more network devices across a network. Golden templates can be used to bring up network devices with network policies that are correctly configured at a foundational level.

BRIEF DESCRIPTION OF THE DRAWINGS

FIG. 2 illustrates command accounting logs that includes network device configuration blocks, according to an example embodiment.

FIG. 3 illustrates command accounting logs arranged into groups, according to an example embodiment.

FIG. 14 illustrates a flowchart of a method for performing functions associated with operations discussed herein, according to an example embodiment.

DESCRIPTION OF EXAMPLE EMBODIMENTS

Overview

Techniques are presented for automatically generating standard network device configurations. In one example embodiment, one or more groups of network device configuration blocks may be obtained. An analysis of the one or more groups of network device configuration blocks may be performed, including identifying respective frequencies associated with respective network device configuration blocks of the one or more groups of network device configuration blocks. Based on the respective frequencies, one or more network device configuration blocks of the one or more groups of network device configuration blocks may be automatically aggregated into a standard network device configuration.

Example Embodiments

Figure 1:
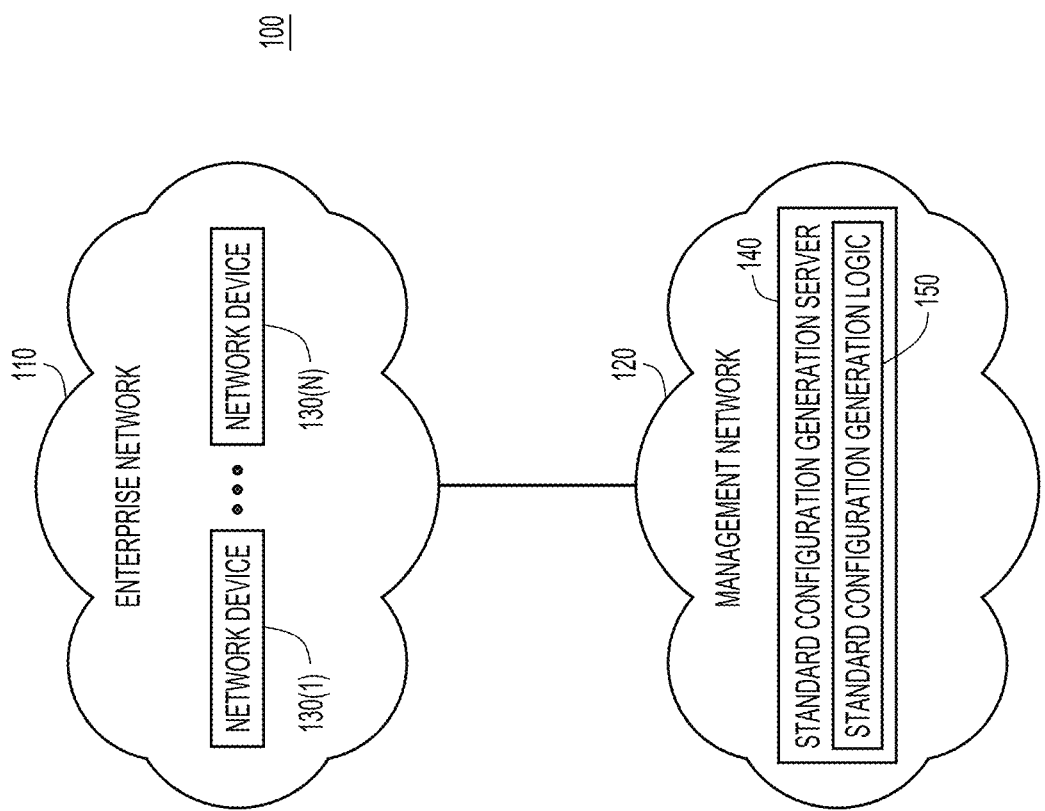
FIG. 1 illustrates a system configured to automatically generate standard network device configurations, according to an example embodiment.

FIG. 1 illustrates an example system 100 configured to automatically generate standard network device configurations. System 100 includes enterprise network 110 and management network 120. Enterprise network 110 includes network devices 130(1)-130(N). Network devices 130(1)-130(N) may have respective configurations. A network device configuration may include an aggregation/collection/combination of configuration blocks defined for a particular section or technology in a given configuration. Configuration blocks may include configuration/software snippets, lines, commands, changes, items, etc. Management network 120 may be responsible for providing one or more services for enterprise network 110, such as providing one or more services for network devices 130(1)-130(N).

During the course of operation, a network administrator of enterprise network 110 may configure (or re-configure) network devices 130(1)-130(N). If the network administrator misconfigures one or more of network devices 130(1)-130(N), the configuration changes can cause one or more networking issues with enterprise network 110 (e.g., major network events such as service/network disruption/outage).

Conventional approaches fail to adequately protect from networking issues caused by network device misconfiguration. Network engineers often have a window of time to implement a change, and typically perform a large amount of work up-front, including mapping out exactly which configuration blocks are to be executed and which configuration blocks will be changed. Network operators can use golden templates to ensure expected results in network environments, adhere to industry and vendor best practices, and provide a mechanism for standard deployment of solutions.

Golden templates are the backbone of policy and configuration standards enforcement, but related tasks remain largely manual as network operators are required to define the policies and configurations they wish to enforce. In particular, the creation and maintenance of an up-to-date library/repository of golden templates is typically a manual process. As a result, a network administrator might attempt to configure a network device with a given golden template that was not designed for that particular network device. In addition, golden templates may become outdated over time due to changes in the network or improved network functionality. Therefore, existing implementations of golden templates can lead to misconfiguration of network devices with significant consequences to network performance.

Therefore, in order to prevent misconfiguration of network devices 130(1)-130(N), standard configuration generation server 140 is provided in management network 120. Standard configuration generation server 140 includes standard configuration generation logic 150, which may be configured to cause standard configuration generation server 140 to automatically generate and/or update standard network device configurations (e.g., configuration policies/templates) at scale. A standard network device configuration may include a set of correlated configuration blocks that regularly appear together and are often executed within a relatively short time period.

Standard configuration generation server 140 may intelligently generate and update standard network device configurations that are unique to enterprise network 110. Standard configuration generation server 140 may automate the discovery and re-enforcement of change management behavior by identifying and categorizing standard network device configurations that a network operator deploys to define solution components. Standard configuration generation logic 150, or any suitable portion thereof, may be provided in any suitable entity or entities. For example, standard configuration generation logic 150 may also/alternatively be provided in network devices 130(1)-130(N).

Techniques described herein may enable a customer to obtain optimal configurations for the assets in enterprise network 110. These certified configurations may be tailored to the specific environment and feature mix of enterprise network 110. These techniques may also enable the customer to identify, categorize, and remediate any configuration blocks/changes. Customers may better understand and quantify the impacts of any configuration blocks and any deviations from vendor-validated and recommended configurations. Therefore, technical improvement achieved by the presented embodiments may involve preventing network device misconfiguration by automatically generating, updating, and/or deploying standard network device configurations.

Figure 4:
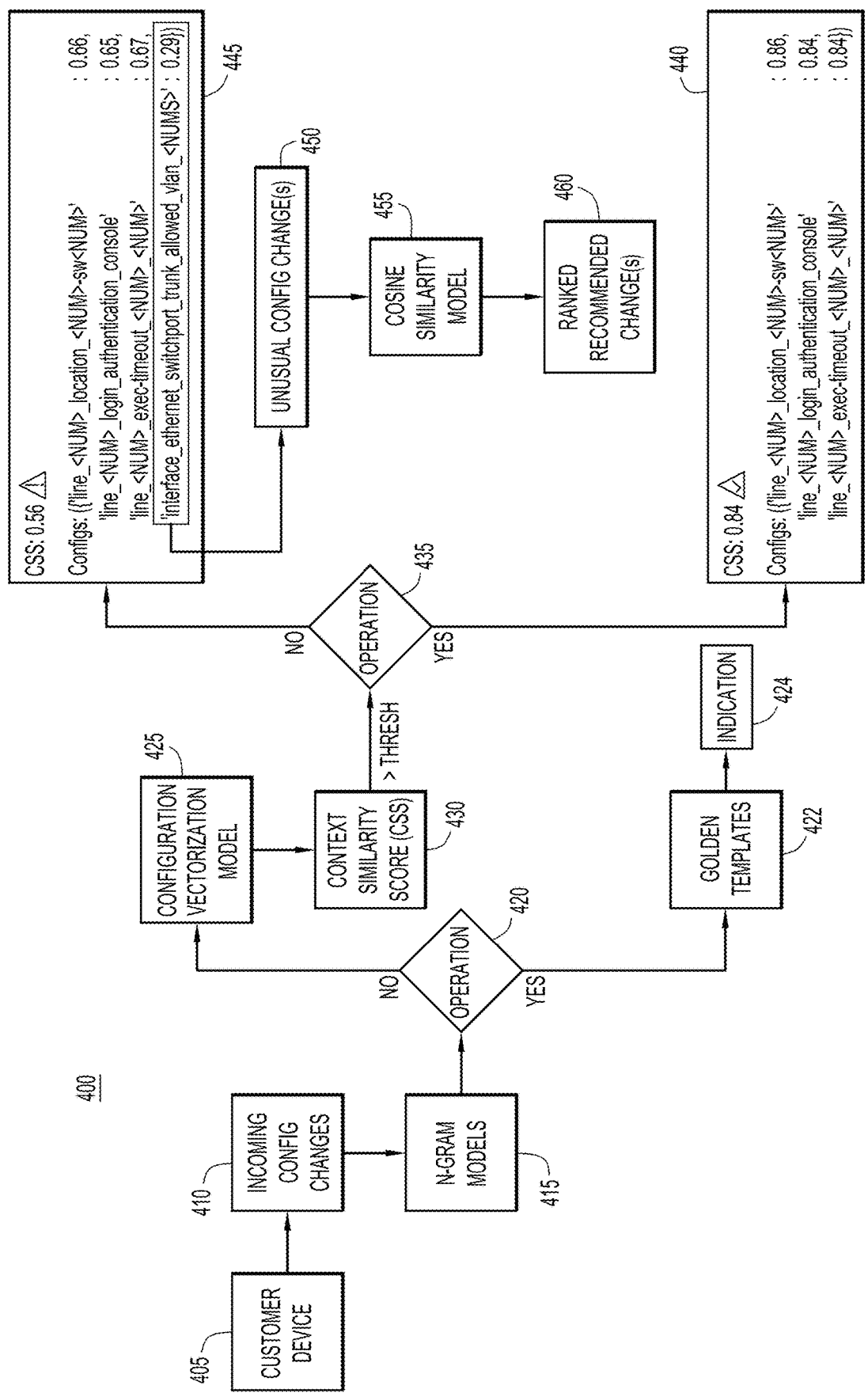
FIG. 4 illustrates a workflow for performing a frequency-based analysis of one or more groups of network device configuration blocks, according to an example embodiment.
Figure 5:
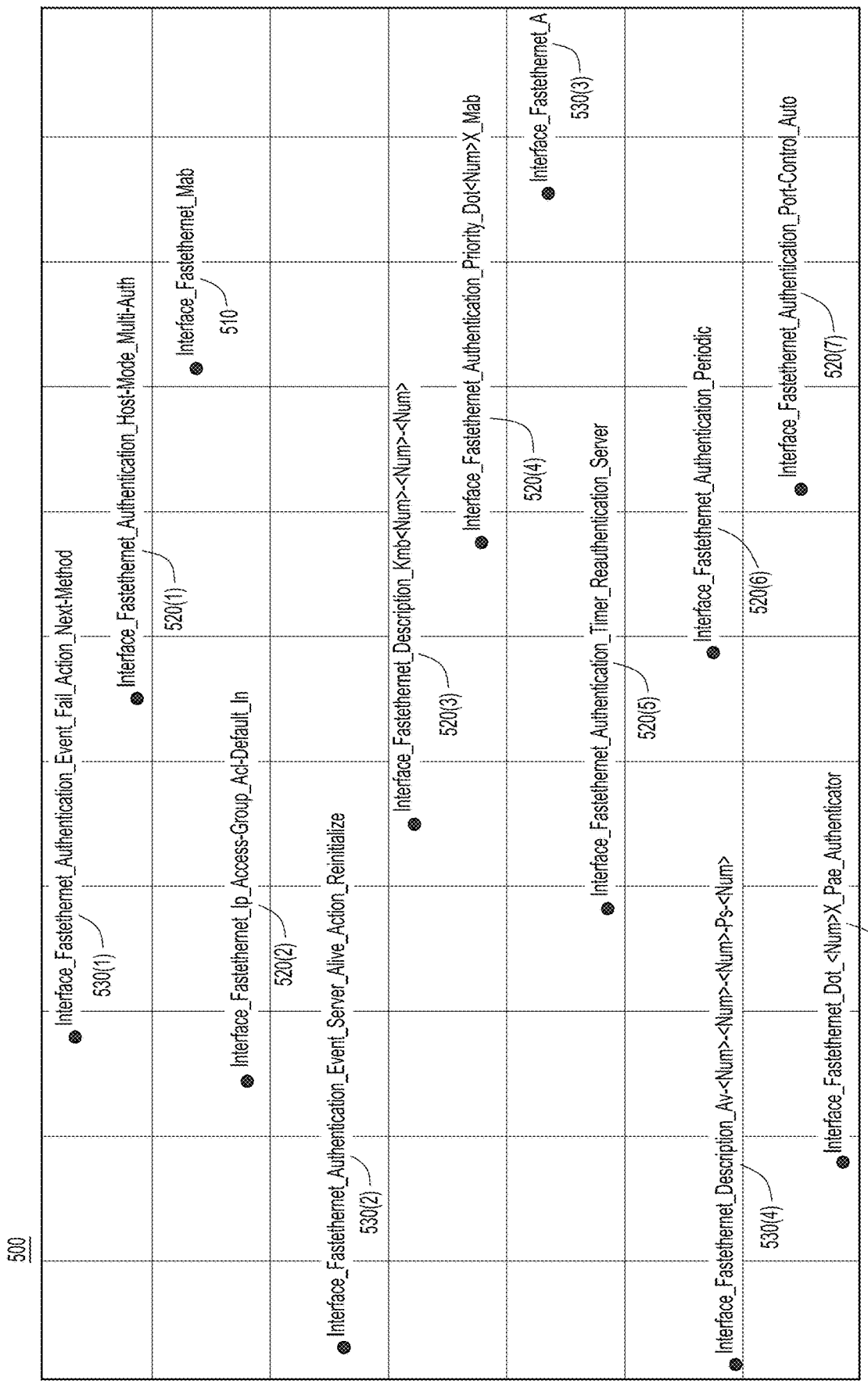
FIG. 5 illustrates a two-dimensional representation of command similarity, according to an example embodiment.
Figure 6:
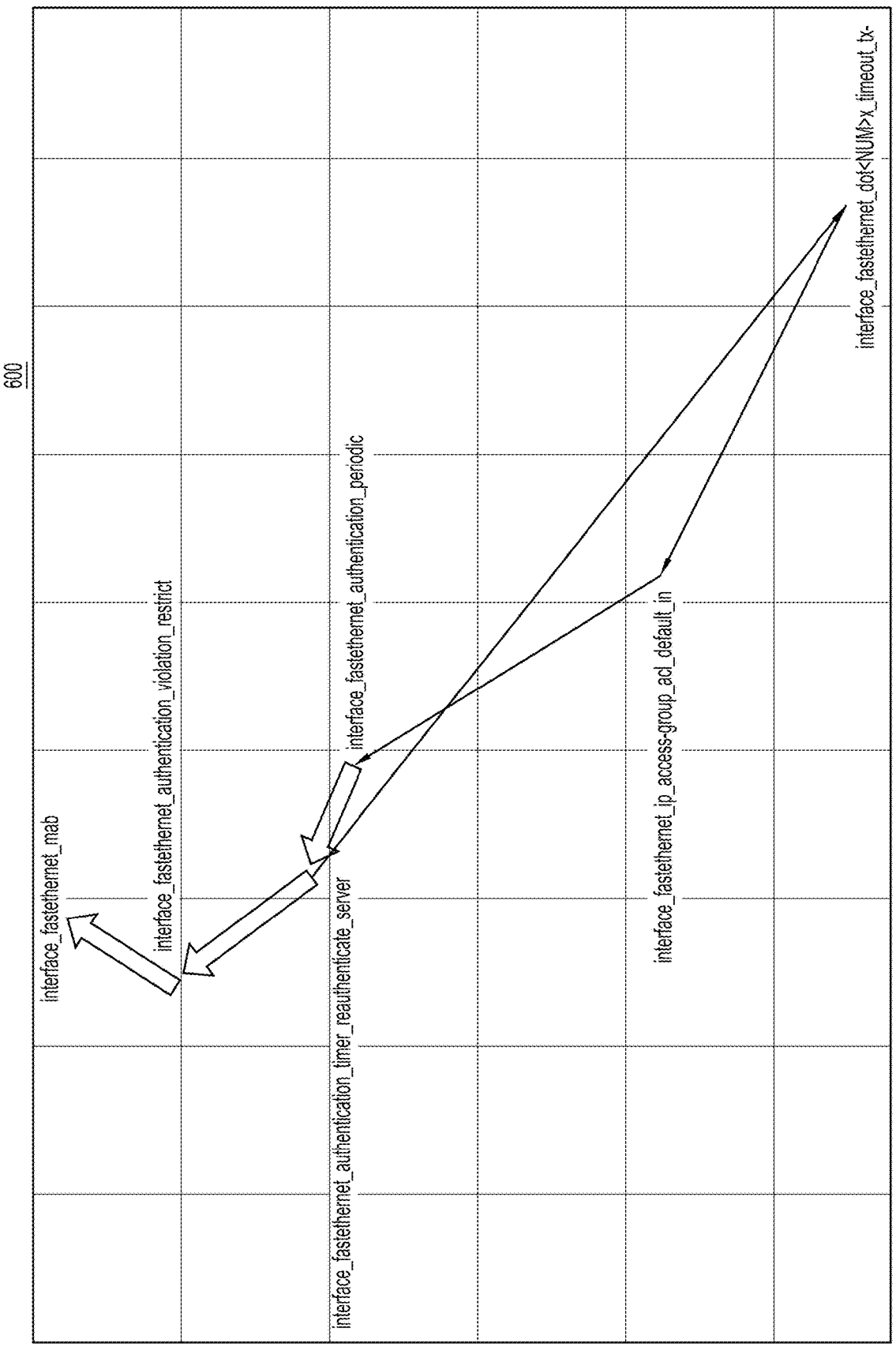
FIG. 6 illustrates a directed graph indicating an order of execution for a set of configuration blocks, according to an example embodiment.
Figure 7:
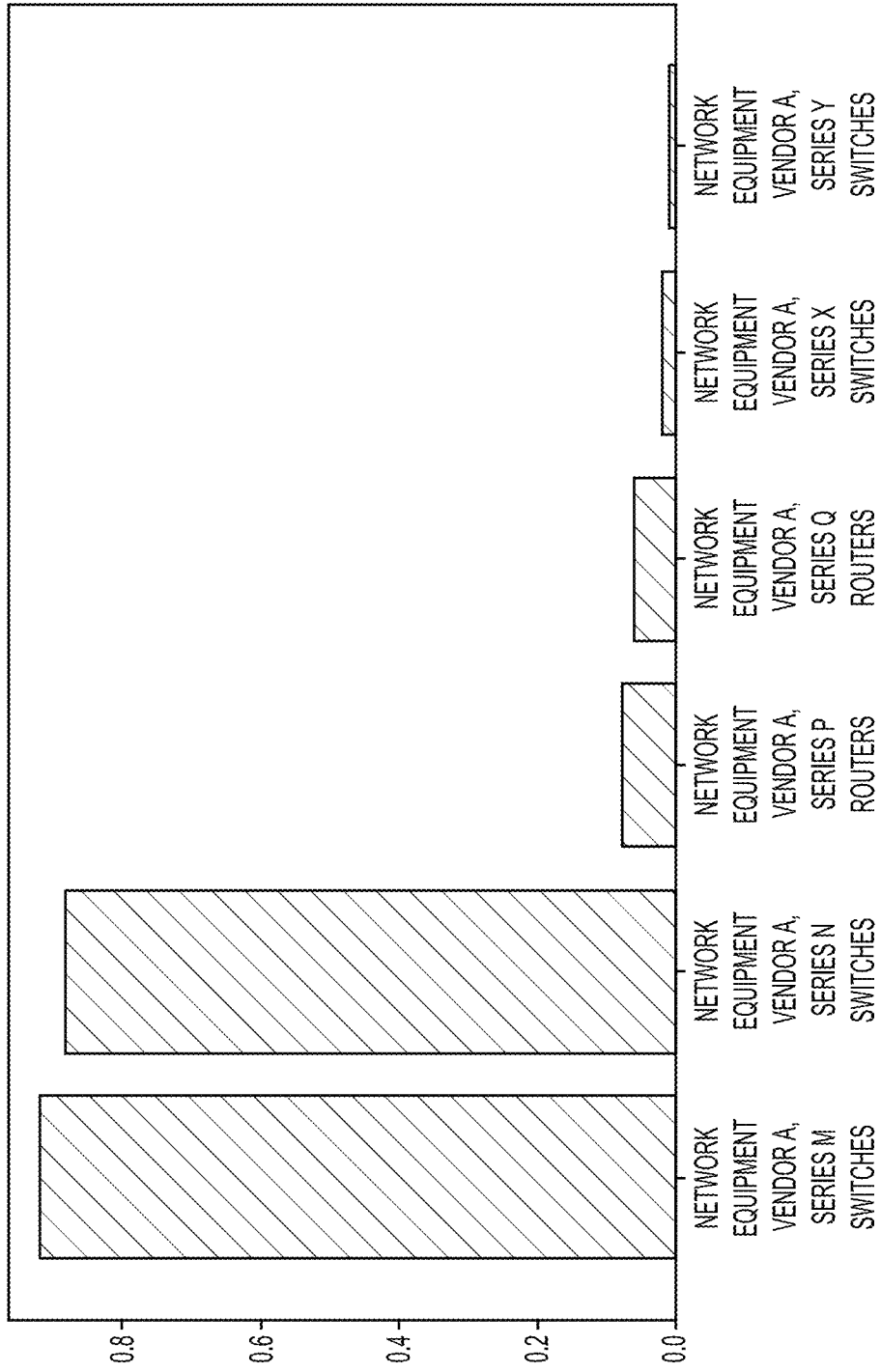
FIG. 7 illustrates a histogram indicating the presence of a single configuration block identified in different product families/platforms, according to an example embodiment.
Figure 8:
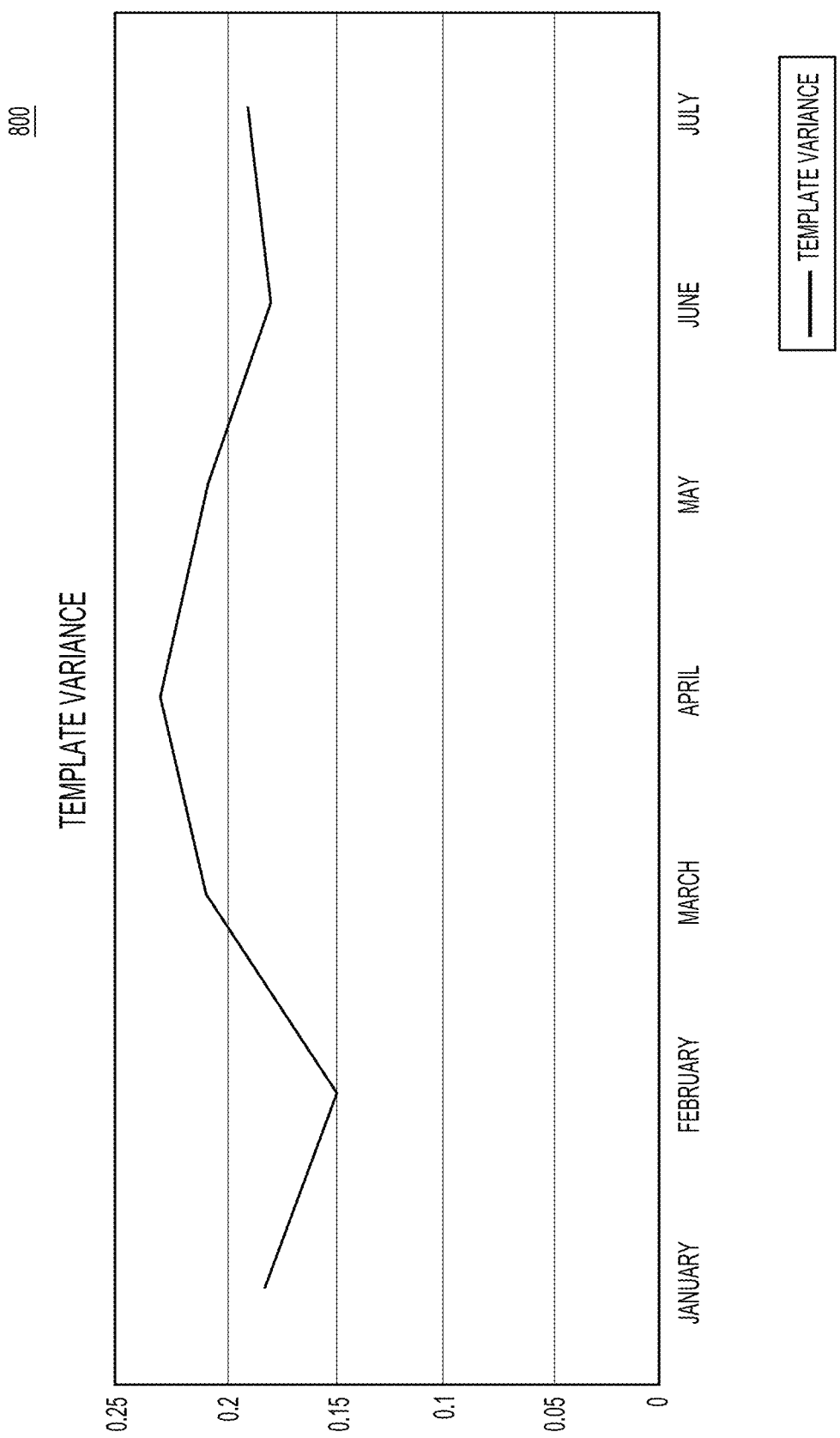
FIG. 8 illustrates a graph of the variance of a standard network device configuration over time, according to an example embodiment.

Automated creation and updating of a standard network device configuration may be accomplished through configuration group and extraction, context scoring, aggregation, variance detection, and application. FIGS. 2 and 3 relate to configuration group and extraction. FIGS. 4-6 relate to context scoring. FIG. 7 relates to aggregation. FIG. 8 relates to variance detection.

With continued reference to FIG. 1, FIG. 2 illustrates example command accounting logs 200 that include network device configuration blocks. Command accounting logs 200 may reflect configurations of network devices 130(1)-130(N), as well as associated timestamps corresponding to each command. Command accounting logs 200 may include any suitable protocol or format, such as Terminal Access Controller Access Control System (TACACS). While command accounting logs 200 are used in the example of FIG. 2, any suitable indication of network device configuration blocks may be used.

Standard configuration generation server 140 may obtain command accounting logs 200 in real-time (e.g., as a network administrator is executing the commands to configure network devices 130(1)-130(N)) or periodically (e.g., once per day). Obtaining command accounting logs 200 in real-time may ensure that standard configuration generation server 140 obtains every command executed by a network administrator. However, command accounting logs 200 may be obtained according to any suitable time frame.

With continued reference to FIG. 1, FIG. 3 illustrates example command accounting logs 300 arranged into groups 310(1)-310(3). In one example, standard configuration generation server 140 may arrange command accounting logs 300 into groups 310(1)-310(3). Standard configuration generation server 140 may use Natural Language Processing (NLP) techniques to extract detailed information from command accounting logs 300, including the length of the configuration session, the network operator who implemented the configuration blocks, and the timestamps, and the sequence of commands that were executed.

Standard configuration generation server 140 may identify groups 310(1)-310(3) based on one or more patterns in command accounting logs 300. For instance, standard configuration generation server 140 may identify commands that are repeated in command accounting logs 300. Certain variables may differ between commands of command accounting logs 300 but the underlying components may remain constant. As a result, groups 310(1)-310(3) may include repeat groupings of similar commands. Thus, standard configuration generation server 140 may extract configuration blocks based on network device configuration activities, such as a rapid succession of repeat changes.

Standard configuration generation server 140 may infer that the sequence and timing of commands have a correlation to each other to accomplish a particular task. Standard configuration generation server 140 may use this correlation to identify the repeat behaviors of a network operator and align configuration tasks to technology topics and standard network device configurations. Standard configuration generation server 140 may infer that certain commands are often executed within approximately the same amount of time.

In the specific example of FIG. 3, standard configuration generation server 140 may determine that a network operator is applying similar commands to different interfaces. Based on the attributes of the network devices and the specifics of the frequently executed commands, standard configuration generation server 140 may infer that the network operator is provisioning interfaces in accordance with a function for configuring access and voice Virtual Local Area Networks (VLANs) for end user connectivity and applying a Quality of Service (QoS) policy.

With continued reference to FIG. 1, FIG. 4 illustrates an example workflow 400 for performing a frequency-based analysis of one or more groups of network device configuration blocks. In one example, standard configuration generation server 140 may perform an analysis of one or more groups of network device configuration blocks including identifying respective frequencies associated with respective network device configuration blocks. Standard configuration generation server 140 may evaluate groupings of configuration blocks for a given network device against a corpus of configuration blocks of similar network devices based on similar sets of attributes of that network device. Standard configuration generation server 140 may determine the rarity or commonality of a set of configuration blocks using a probabilistic based approach, which helps define standard configuration blocks for a product family or role type.

By determining a set of configuration blocks as rare or common amongst a defined corpus, standard configuration generation server 140 may identify unusual configuration blocks within a network device and track how the network device configurations affect the predicted platform standard. Consider an example where standard configuration generation server 140 consistently detects the creation of a new access list, and then that access list is referenced as part of a Simple Network Management Protocol (SNMP) server configuration with a remark about "network management." In that case, standard configuration generation server 140 may draw a correlation of the sub-components that were executed within a reasonable timeframe during the configuration session. In one example, standard configuration generation server 140 may discover configuration changes based on configuration change graphs generated from one or more of network devices 130(1)-130(N).

With more specific reference to FIG. 4, standard configuration generation server 140 may obtain, from customer device 405, incoming configuration blocks 410. Standard configuration generation server 140 converts incoming configuration blocks 410 to one or more N-gram models 415. For example, standard configuration generation server 140 may group incoming configuration blocks 410 as one or more tokens (e.g., as described in accordance with FIG. 3). Standard configuration generation server 140 may create N-gram models 415 (e.g., groupings of tokens, such as groups 310(1)-310(3)) based on incoming configuration blocks 410.

At operation 420, standard configuration generation server 140 determines whether N-gram models 415 match (e.g., are present in) any existing standard network device configurations 422. Existing standard network device configurations 422 may include standard network device configurations that were automatically determined by standard configuration generation server 140 or manually input by a network administrator/engineer. If there is a match, standard configuration generation server 140 may generate an indication 424 that N-gram models 415 are match one or more standard network device configurations. If there is not a match, standard configuration generation server 140 may provide N-gram models 415 to configuration vectorization model 425.

Standard configuration generation server 140 may train configuration vectorization model 425 to perform an analysis of one or more groups of network device configuration blocks including identifying respective frequencies associated with respective network device configuration blocks (e.g., N-gram models 415). Specifically, standard configuration generation server 140 may train configuration vectorization model 425 to predict a configuration block based on surrounding context (e.g., any configuration blocks around incoming configuration blocks 410).

While configuration vectorization model 425 is specifically discussed herein, any suitable machine-learning model (e.g., a neural network model) may be trained on lines of historical configuration blocks. Standard configuration generation server 140 may input these historical configuration blocks into a neural network model that captures context around the configuration block of interest. The machine-learning model may thereby learn based on the context (e.g., surrounding lines) around a particular line. Thus, given lines around a particular line, the machine-learning model may predict that particular line.

In this example, configuration vectorization model 425 has already been trained, and may be used in real-time. At operation 430, upon obtaining N-gram models 415, configuration vectorization model 425 may compute a global score for N-gram models 415 that indicates a likelihood of an aggregate presence of N-gram models 415. The global score, which may also be referred to as a "context similarity score," may be based on the historical configuration blocks on which configuration vectorization model 425 was trained. To help understand the magnitude of the rarity of a given configuration block amongst the set of configuration blocks of interest, the global score may serve as a contextual indicator of that particular set of configuration blocks. That is, the global score may indicate whether an unusual configuration block is present in a given configuration set given all surrounding phrases of the configuration block set.

At operation 435, standard configuration generation server 140 may determine whether the global score is greater than a threshold. If global score is greater than the threshold, the incoming configuration blocks are considered to be "normal," and if the global score is less than the threshold, the incoming configuration blocks are considered to be "unusual." In the example of FIG. 3, the global score can take any value from zero to one, and the threshold is 0.8. If the global score is greater than 0.8, standard configuration generation server 140 may generate an indication 440 that the global score is greater than 0.8. Indication 440 may display the global score of 0.84.

Indication 440 may also display individual scores (also referred to herein as "contextual embeddings" or "embeddings") that indicates a likelihood of a presence of a corresponding network device configuration block. The individual scores may indicate a level of unexpectedness for a corresponding configuration block given the surrounding configuration blocks. Standard configuration generation server 140 may compute the individual scores. For example, configuration vectorization model 425 may generate an individual score for each configuration block. In the example of FIG. 3, the respective individual scores displayed in indication 440 are 0.86, 0.84, and 0.84.

Standard configuration generation server 140 may compute/calculate the global score based on the individual scores (e.g., based on an average of the individual scores). Standard configuration generation server 140 may use the individual scores to help identify and distinguish between common and rare configuration blocks that may or may not match standard network device configurations.

Returning to operation 435, if the global score is less than the threshold, standard configuration generation server 140 may generate an indication 445 of the global and individual scores, and may also flag any unusual configuration blocks at operation 450. Standard configuration generation server 140 may compute/calculate the global score (here, 0.56) and the respective individual scores (here, 0.66, 0.65, 0.67, and 0.29). In this case, the configuration block with the individual score of 0.29 is flagged. The flag may also be displayed as part of indication 445.

The first three lines of configuration blocks shown in indication 445 are identical to the three lines of configuration blocks shown in indication 440. The individual and global scores shown in indications 440 and 445 are different due to the inclusion of the fourth line of configuration blocks in indication 445. The line "interface ethernet switchport trunk allowed vlan <num>" lowers the individual and global scores shown in indication 445, because that line does not fit contextually with the rest of the command lines. When the unusual configuration block is removed, the global score increases beyond the threshold, as shown in indication 440. This example illustrates that even a single configuration blocks among incoming configuration blocks 410 may significantly impact global and individual scores.

In one specific example, a switchport may include a number of attributes that are common across a particular platform or functional role, including a VLAN (e.g., a service policy for prioritization) and QoS (e.g., speed and duplex). Because configuration vectorization model 425 may be trained to predict configuration blocks that are expected to be seen in conjunction with other configuration blocks, the introduction of a different VLAN number or port-security method may register as an unexpected configuration block in the prediction and be returned as a configuration block that does not have context with the other configuration blocks. When events are observed at a high level of frequency (e.g., multiple times a day, every time a new switch is powered on, etc.), standard configuration generation server 140 may build out and reverse engineer the standard network device configuration. That standard network device configuration may be used, for example, to deploy a sales office in a building or configure access layer ports. Thus, repeat patterns may be used to implement a technology or configure a portion of a solution.

At operation 455, standard configuration generation server 140 may compute the cosine similarity of the set of configuration blocks against standard network device configurations. Based on operation 455, standard configuration generation server 140 may generate an indication 460 of one or more recommended/suggested network device configuration blocks. In one example, standard configuration generation server 140 may search through standard network device configurations and recommend the top "n" standard network device configurations that are most similar to the incoming set of configuration blocks based on structural similarity. Standard configuration generation server 140 may compute structural similarity in order to recommend the set of configuration blocks that was most likely intended by the network administrator. Standard configuration generation server 140 may thereby enable reinforcement of standard network device configurations.

Standard configuration generation server 140 may determine how unusual a given set of configuration blocks is, based on the surrounding context of other configuration blocks. Standard configuration generation server 140 may further estimate how much of a standard network device configuration has been implemented and provide suggestions for completing the network device configuration in question. Standard configuration generation server 140 may use past configuration block frequency and the inter-relationships of configuration blocks to automatically identify the standard network device configurations (e.g., microtemplates) that network operators use to enforce and deploy solutions. By establishing a context and relational score of how likely individual configuration blocks are to occur as part of a standard network device configuration, standard configuration generation server 140 may support configuration best practices, identify standard network device configurations for policy enforcement and conformance, and produce a proactive model to aid the prediction of outcomes of change windows.

With continued reference to FIGS. 1 and 4, FIG. 5 illustrates an example two-dimensional representation 500 of configuration block similarity. Two-dimensional representation 500 includes target configuration block 510, contextually similar configuration blocks 520(1)-520(7), and contextually dissimilar configuration blocks 530(1)-530(5). Two-dimensional representation 500 demonstrates that similar configuration blocks are grouped by configuration vectorization model 425 more closely to the target configuration block than dissimilar configuration blocks.

Machine learning and data science may be used to perform complex identification and association of configuration blocks in a standard network device configuration of network operator behavior. The context scoring approach may involve capturing expert inputs from a network, which may be used to identify configuration blocks that are out of place or not used by other engineers in a similar context. Configuration vectorization model 425 may be trained on whole configuration blocks, using the surrounding configuration blocks as context.

Furthermore, a hidden layer of configuration vectorization model 425 may be used to obtain "context" vectors for each configuration block. These "context" vectors may be used to determine a contextual similarity. The similarity score may be generated by comparing known standard network device configurations against an example set of configuration blocks, where the standard network device configurations with the most similar contexts are bubbled up to the top. For example, given one set of configuration blocks, configuration vectorization model 425 may determine the similarity of another set of configuration blocks by comparing respective "context" vectors to each other using a distance function. Configuration vectorization model 425 may thereby generate a context similarity score for an incoming set of configuration blocks.

FIG. 6 illustrates an example directed graph 600 that indicates an order of execution for a set of configuration blocks. Directed graph 600 includes a plurality of nodes, which represent respective configuration blocks, and edges, which represent the connection between the configuration blocks. The width of the edges represent the respective strength of the relationships between the nodes. In particular, a thicker edge signifies a stronger connection, meaning the connected configuration blocks have appeared together more frequently. Thus, the width may relate to the contextual scoring relationships between the nodes. Directed graph 600 may enable frequency-based groupings.

Based on the respective frequencies associated with the configuration blocks, standard configuration generation server 140 may automatically aggregate one or more network device configuration blocks into a standard network device configuration. In one example, standard configuration generation server 140 may derive the standard network device configurations from the frequency of identified configuration blocks. By evaluating the presence of individual configuration blocks, standard configuration generation server 140 may aggregate multiple frequently recurring contextual components into a standard network device configuration.

Standard configuration generation server 140 may automatically aggregate the one or more network device configuration blocks based on any suitable metadata associated with a given network device. One suitable example of metadata may include a product family associated with one or more network device configuration blocks. Another suitable example of metadata may include a function of a network device associated with one or more network device configuration blocks. The function of a network device may include a functional role or importance of a network device in a network, and may be derived from available context such as a topological location of a network device in a network. Still another suitable example of metadata may include software of a network device associated with one or more network device configuration blocks (e.g., individual software versions).

In one example, unique identifiers (e.g., hashes) may be applied to standard network device configurations for comparison against the metadata. Furthermore, standard configuration generation server 140 may automatically create multiple standard network device configurations for any suitable level of classification of network devices. For example, a given standard network device configuration may apply to all switching products, a switching product family, a specific switch model, or individual devices (e.g., product identifiers or Stock-Keeping Units (SKUs)).

FIG. 7 illustrates an example histogram 700 indicating the presence of a single configuration block identified in different product families/platforms. In this example, detected configuration block 0764AF2 is enabled relatively frequently in configurations of Network Equipment Vendor A, Series M Switches and Network Equipment Vendor A, Series N Switches, but is enabled relatively infrequently in configurations of Network Equipment Vendor A, Series P Routers; Network Equipment Vendor A, Series Q Routers; Network Equipment Vendor A, Series X Switches; and Network Equipment Vendor A, Series Y Switches.

As a result, standard configuration generation server 140 may include configuration block 0764AF2 in one or more standard network device configurations for Network Equipment Vendor A, Series M Switches and Network Equipment Vendor A, Series N Switches, but may exclude configuration block 0764AF2 from one or more standard network device configurations for the other product families. By using product family or functional role groups of a network as an aggregation model, standard configuration generation server 140 may predict the configuration block components that define the standard network device configuration that is used by a given product family.

FIG. 8 illustrates an example graph 800 of the variance of a standard network device configuration over time. As shown, the similarity of a given standard network device configuration may be calculated dynamically by examining the context similarity variance observed from comparing all known versions of the standard network device configuration. For example, a customer might discover a better standard network device configuration than the current standard network device configuration, or an internal process may change such that the standard network device configuration no longer includes all the same configuration blocks. In these (and other) cases, it may be desirable to update a standard network device configuration.

Deviations from an expected configuration may not only provide a mechanism to identify potential misconfigurations (FIG. 4), but may also enable discovery of new configuration block trends. For example, if a neural network learns of multiple deviations of the same non-context configuration block that is part of a standard network device configuration, standard configuration generation server 140 may apply a variance threshold to accommodate for on-the-fly standard network device configuration updates, based on the frequency and number of proposed updates over a given time period. An in-flux of deviations may not necessarily imply that a misconfiguration occurred; rather, such deviations may signal an improvement to the standard network device configuration.

Variation analysis may be derived by systematically comparing aggregate standard network device configurations over time. As engineering and business decisions are made, or new features introduced and optimized, new variations of existing standard network device configurations may be cataloged and updated.

In one example, standard configuration generation server 140 may automatically aggregate one or more subsequent network device configuration blocks into a subsequent (e.g., updated) standard network device configuration. Standard configuration generation server 140 may determine whether a change has occurred from the previous standard network device configuration to the subsequent standard network device configuration. For example, configuration blocks in the subsequent standard network device configuration may vary from those used in the previous standard network device configuration.

In response to determining that the change has occurred, standard configuration generation server 140 may replace the previous standard network device configuration with the subsequent standard network device configuration. For example, standard configuration generation server 140 may begin enforcing the subsequent standard network device configuration based on proposed network device configurations.

Standard configuration generation server 140 may replace the previous standard network device configuration with the subsequent standard network device configuration based on a reputation of a user associated with the change. For instance, the user may be a network administrator who is proposing (or has already implemented) the change. User reputation may be determined based on reputation analysis of a network engineer with respect to standard network device configuration thresholds. Reputation may be used as a factor to determine whether the user is consistently misconfiguring a network or the standard network device configuration is changing.

In another example, standard configuration generation server 140 may replace the previous standard network device configuration with the subsequent standard network device configuration based on a frequency of a detection of a network device configuration block associated with the change. For example, a large amount of changes over a short period of time may indicate that the changes are intentional/legitimate.

The factors for determining how variance automatically updates a standard network device configuration may be user-controlled. In one example, a user may set thresholds to require a certain number of identical configuration blocks occurring in a given time frame. In another example, the user may set the reputation level beyond which users are permitted to make changes that affect the standard network device configuration. In still another example, the user may explicitly highlight or indicate that a configuration block should be used to update the standard network device configuration.

The variations of incoming configuration blocks that align with discovered standard network device configurations may be monitored. A flexibility model may allow standard network device configurations to adjust as network operators make changes to the standard network device configurations. Incoming changes may be monitored for alignment with existing standard network device configurations. The models may be updated appropriately if a threshold showing of sufficient change has been met.

Techniques described herein may be applied in any suitable implementation. In one example, an on-box mechanism may be integrated to intercept configuration blocks. The on-box mechanism may intercept the configuration blocks executed by the user on a network device and test, again, the configuration block changes against the repository of standard network device configurations. This may provide a backup effort to abort possible misconfigurations before the network device pushes the configuration blocks into its hardware. The network device may thus make an intelligent decision about whether to avoid making a change based on historical standard network device configuration data.

In another example, a process may be provided whereby alerts/suggestions may be sent to a user if proposed configuration blocks do not match a standard network device configuration. The alerts/suggestions may be provided via a change management system/window. The reputation of the user may also be taken into account. For example, if the user is the lead network architect, the system may provide a warning that there is a mismatch, but if the user is a junior architect, the system may prevent the user from executing the mismatched configuration blocks.

The collection of discovered standard network device configurations may be fed into an orchestration component or playbook system that creates a master standard network device configuration based on the discovered configuration blocks for a given product family or device type. This functionality may provide a zero-touch deployment system to provision new devices based on the discovery process of the standard network device configurations derived from configuration blocks. Network devices may automatically pick up discovered standard network device configurations via netboot or zero-touch provisioning protocols. Network management and orchestration packages may also be used to automatically provision devices based on upon these discovered standard network device configurations. Thus, a network engineer may automate the provisioning process of new or existing hardware by pushing a predicted standard network device configuration to the device.

An enforcement and validation option may also be provided. An Application Programming Interface (API) layer may be incorporated into a change management workflow and/or be directly called from a network device. A configuration block may be checked for deployment before being pushed into the network device hardware and the forwarding plane. This may provide a safety net to ensure that the proposed configuration blocks are in line with the standard network device configuration of the implementing organization. Integrating an automated standard network device configuration discovery system with change management processes may provide the ability to test configuration blocks against standard network device configurations by evaluating the variance or distance of the proposed configuration block against a standard network device configuration. Thus, standard network device configurations may be proactively enforced based on variance. Role-based and user trust claims may also be considered to provide increased flexibility in the strictness of enforcement based on the technology depth and breadth of the user implementing the change.

In one example, standard configuration generation server 140 may automatically configure a network device based on the standard network device configuration. In this regard, a verification and validation component may compare configuration blocks for similarity and distance to the known standard network device configurations. The validation component may be integrated with network management and orchestration systems or function as a standalone process to alter the running configuration of a network device based on the distance from known standard network device configurations.

For instance, the validation component may read the running configurations of network devices for a particular product family or device type that are associated with a collection of standard network device configurations. The configuration blocks of the configuration may be compared with the known standard network device configurations that exist for the product family or device type. A distance calculation may determine how similar the blocks of configuration are to the standard network device configurations. A confidence score may be determined to predict any additional text components that may be expected for the given configuration block.

The verification and validation component may operate in a strict or non-strict capacity. A workflow may alarm in a non-strict capacity that there is an exception to the standard network device configuration, or in a fully automated capacity to directly overwrite the running configuration block with the standard network device configuration. The latter example may provide a full end-to-end enforcement option to validate that no configuration blocks deviate from the known standard network device configurations or standardization behavior.

Thus, techniques described herein may enable extracting information and building out a configuration from scratch for a given network device based on individual customer standards, without requiring explicit instructions from the customer. This is helpful for provisioning or engaging with validation/design services. An early warning system is also provided. Consider a system having standard network device configurations that are accessible via API. The system may detect that a junior operator is about to execute given configuration blocks, and may in response provide an indication of whether the configuration blocks comply with a standard network device configuration and/or suggest configuration blocks in line with the standard network device configuration.

Standard network device configurations may be automatically created and updated for a large enterprise customer or service provider. The standard network device configurations may be created/updated while network devices are configured as part of day-to-day operations, during device installation, and even based on troubleshooting of network issues. Pre-existing standard network device configurations may also be used. For example, a customer may tag a network device configuration as "standard" to ensure that the system maintains/updates the standard network device configuration. Standard network device configuration may be excluded from updating.

Automatically generating standard network device configurations may accelerate the processes of bringing up network devices and/or reallocating network devices to different roles. The appropriate standard network device configurations may be quickly downloaded to a given network device so that a network administrator does not need to build a configuration from scratch. Once the standard network device configuration is established, any suitable device-specific change may be made to the standard network device configuration, manually or automatically. With scripting and other editing tools, a new configuration may be built for a device before the configuration is copied over. Techniques described herein may be integrated with a customer experience portal to provide the customer with easy access and visibility to the standard network device configurations associated with that customer.

Techniques described herein may automate the creation, monitoring, and updating of standard network device configuration as changes occur over time. These techniques may use historical configuration block data to discover common network technology and standard network device configurations (e.g., solution templates) based on implementation behavior. Frequent configuration patterns that equate to a functional standard network device configuration or configuration standard for a network device platform may be identified/combined. A standard network device configuration may be created for specific models or classes of network equipment.

Standard network device configurations may be monitored, updated, and calculated for variance over time. This may allow for continuous updating of a network standard network device configuration at scale. A contextual scoring system may learn patterns from expert input on a network and act as a configuration guardian for new incoming inputs by providing a confidence score and common alternative input suggestions. Automating the process for per-customer standards may short-circuit a manual process and allow the enablement of recommendation and enforcement services to gain traction at early stages.

Customer-implemented configuration blocks in a network device may be monitored (e.g., during maintenance windows) in order to capture and predict the frequency at which terms appear together. The terms may include individual components or lines executed by a network operator. Frequency analysis may be used to identify a particular bundle of configuration blocks happening frequently on a particular platform/product ID/OS type/pairings with software and feature sets/etc. Standard network device configurations that are actually used may be identified to implement a solution automatically. This allows for short-circuiting research and knowledge extraction from the customer.

Standard network device configurations may be discovered based on the previous behavior of a network operator. By examining the frequency at which configuration blocks are executed, who is executing the configuration blocks, and the proximity of configuration blocks executed in parallel, a model may be established that baselines common configuration block patterns that are associated with a particular function or technology. These standard network device configurations may be referenced by policy enforcement engines to ensure adherence to the discovered standards.

These techniques may be used to differentiate standard network device configurations even in diverse networks where potentially thousands of change events occur frequently. Additional metadata such as the user implementing the change, the product family of a device, and advanced attributes including location in the network or device business importance may draw delineation points to focus the scope of standard network device configuration applicability and aggregation. In this approach, a standard network device configuration for a particular device may not be useful for other product families as each product family may have respective commands and configurations. Product family and other attribute isolation enables capturing the unique patterns from similar sets of devices.

To find patterns in a diverse network of network devices, a series of filtering steps may be applied to isolate these attributes, after which language modeling (e.g., configuration vectorization) may be performed on each attribute family individually. For the filtering, timestamped configuration blocks and accompanying metadata may be retrieved for a device identifier through a network profiler. Any suitable number of device identifiers may be compiled for a particular product family, and the configuration blocks in each device may be ordered by time to produce an organized set of configuration blocks.

Groupings/n-grams of ordered configuration blocks from 1-gram to 6-gram per device may be created using this organized set of configuration block groupings. The groups of configuration blocks may be used to obtain the frequency by counting the number of unique groupings of configuration blocks that appear in all network devices in the common attribute family. This may enable identifying potential standard network device configurations through frequency analysis using n-grams.

Techniques described herein may enable discovery of how experts/engineers handle a given situation by aggregating certain configuration blocks and collections of those configuration blocks into standard network device configurations to solve a problem or perform a function. Additionally, generalization of standard network device configurations may provide guidance regarding which configuration blocks should/can be executed without affecting other devices. For example, standard network device configurations may be cleaned of customer-specific numberings (e.g., VLANs, Internet Protocol (IP) addresses, routing protocol specifics, etc.) so as to provide an abstract placeholder for large-scale similarity assessments.

Figure 9:
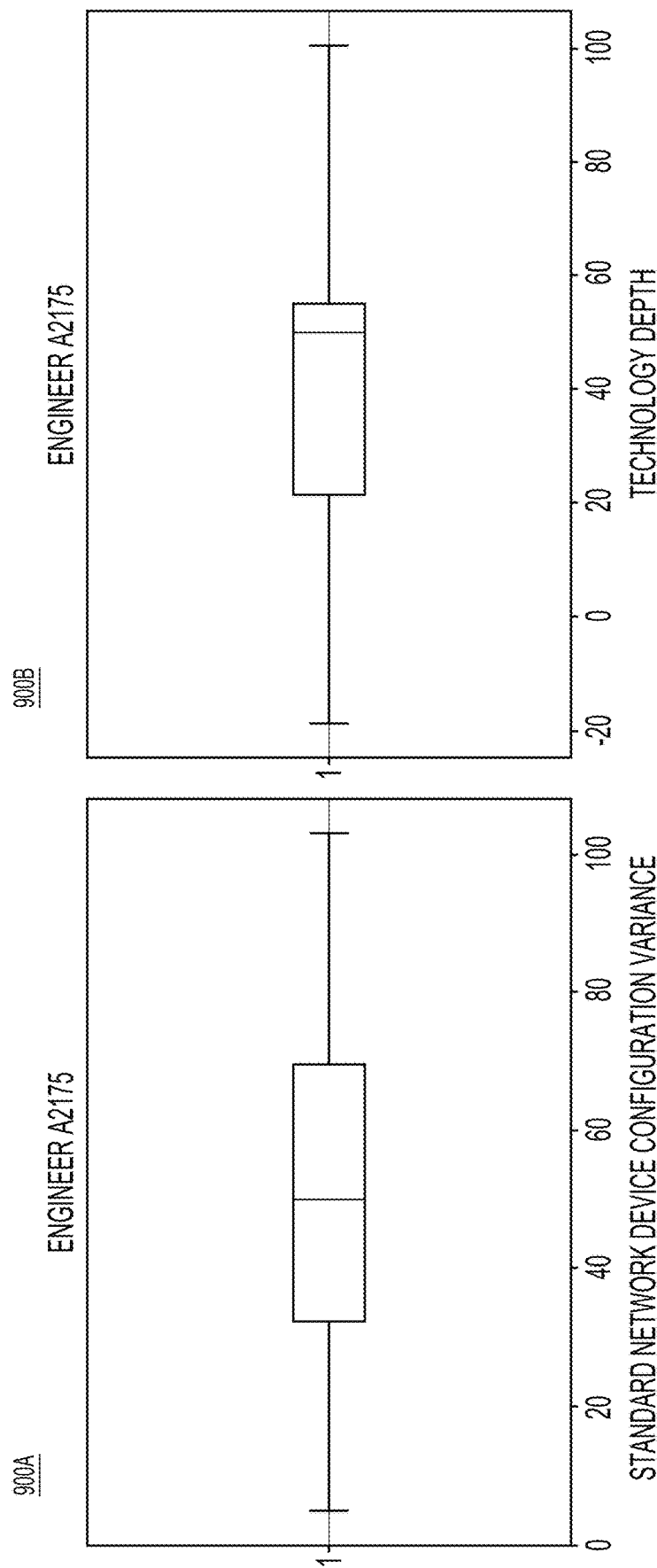
FIG. 9A illustrates a graph depicting engineer template variance compared to company averages, minima, and maxima, according to an example embodiment.
FIG. 9B illustrates a graph depicting engineer technology depth compared to company averages, minima, and maxima, according to an example embodiment.
Figure 10:
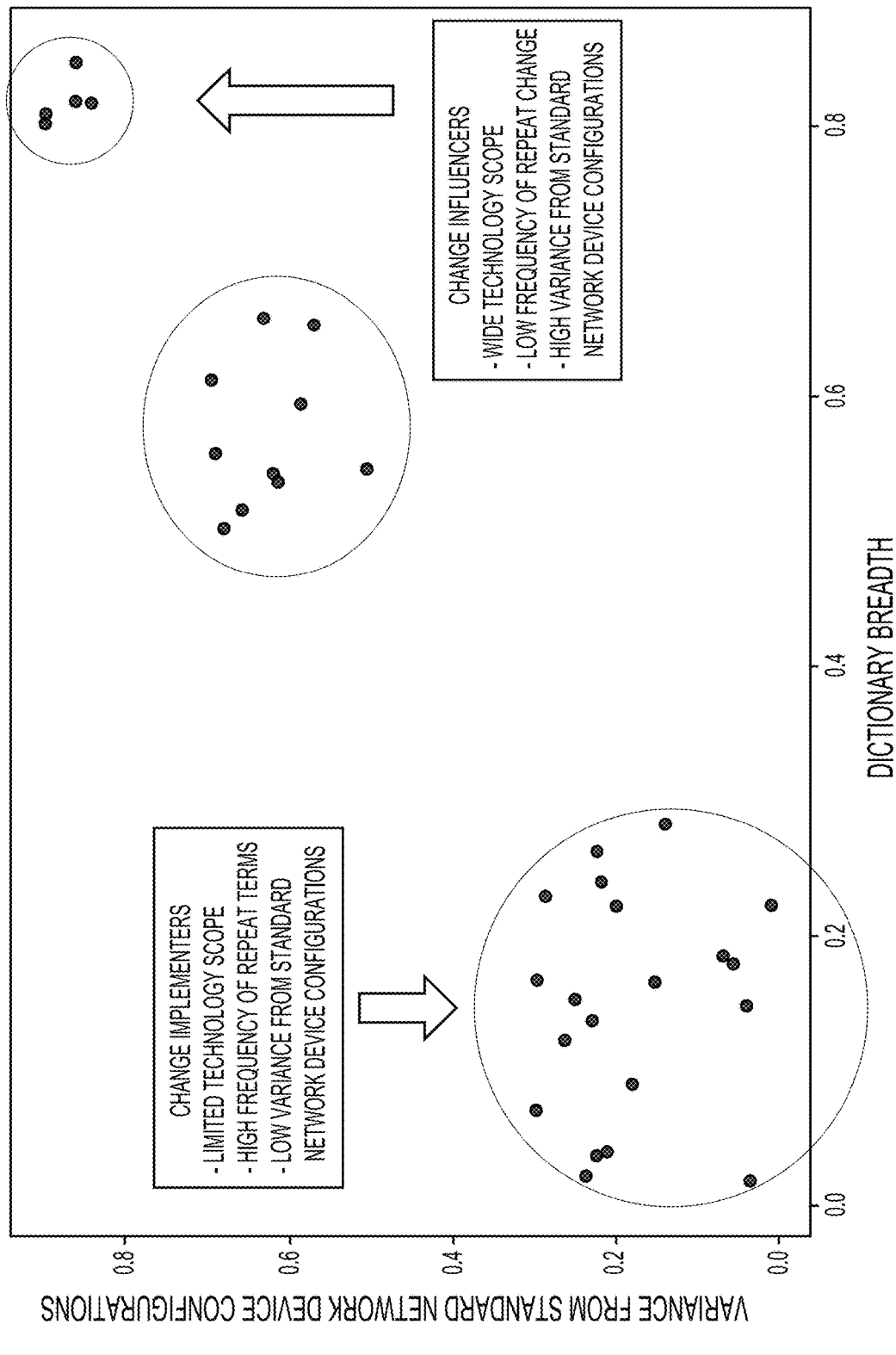
FIG. 10 illustrates a graph depicting an aggregate grouping of engineering skill within an organization, according to an example embodiment.

FIGS. 9A, 9B, and 10 relate to aspects with respect to user trust and competency profiling through configuration change management in network environments. Briefly, techniques described herein may establish a framework for competency and trust of network staff of an organization by intelligently analyzing and evaluating historical configuration changes on a per-user basis. A reputation and trust metric scoped for network engineers and operators may be created. Using historical configuration data implemented by network operators, a system may be developed that compares and categorizes engineers based on past configuration behavior. This information may have applicability in the creation of change management safety nets, case routing, influencing of configuration templates and network design, and identifying skill gaps among teams.

In addition to accounting for individual competency and aggregate skill set of network staff, techniques described herein may also enable determining the level of trust earned by network engineers for a particular technology area based on past work. This trust may help ensure that the best engineer is implementing a configuration change, and that appropriate safety precautions are in place during change windows. Using a variety of internal sources (e.g., Service Request (SR) data, configuration history for network engineers, etc.) and external sources (e.g., certifications, trainings, etc.), network engineer education and career progression may be established to predict the success of a change management window. The prediction may be based on the complexity of the change, deviation from discovered standard network device configurations, and overall competency of the change implementer.

Thus, the competency and skill set of a change implementer may be analyzed and evaluated to ensure the best engineer is implementing a configuration change, and that safety precautions are in place during change windows. This competency analysis may ensure that the optimal engineer is implementing a configuration change, may ensure that the configuration change is following modular and standardized templates/best practices, and may chart the growth pattern of an engineer over a career.

Techniques described herein may use data science to develop a technology and configuration dictionary of terms associated with a change implementer based on prior change windows. Users may be categorized into "template influencer" or "template implementer" based on the reputation and past success rate of changes during a change window. Career and competency growth may be interpreted based on engineer participation in training, design review, and SR resolutions. Social and technical data profiling may be used to predict the outcome of a change management window/maintenance based on engineer behavior and learned competency. Pattern recognition of technology-based successes/failures may correlate with additional training resources. An engineer profile may be used to influence the implementation of a configuration change on a network device.

Configuration association and dictionary creation may be employed. Network device configuration change logs, accounting logs, or configuration differences may provide insight into the scope of technologies and the frequency with which an engineer performs a particular task. Over time, the vocabulary and dictionary of terms may encompass the level of competency and technologies regularly configured by the engineer. For example, an engineering team may be segmented based on specializations, with emphasis around deeper understandings of fewer technologies. The dictionary of configuration tasks for this team may be larger for a given technology, but focused on the area of expertise. By contrast, a Network Operation Center (NOC) engineer may have a broader dictionary from a technology perspective, but spend the majority of time implementing repeat tasks and standard network device configurations determined by the engineering and architecture groups.

Techniques described herein may profile engineers based on past history (e.g., previous behavior), learning experiences, and implementation history to categorize the impact of an engineer. A dictionary of terms may provide frequently executed configuration blocks that can be broken down into technologies and individual keywords that are associated with the user dictionary. Over time, this information may indicate configuration blocks that are regularly executed by the engineer and the technologies frequently operated and influenced by that engineer.

Aspects described herein also relate to configuration templates, change implementers, and change influencers. Network operators may perform repeat tasks, and use some level of recognizable patterns in configurations to accomplish similar tasks on disparate devices. Standard network device configurations may be automatically discovered in a customer environment. The scope of the engineer personal dictionary of change events may be considered, and the metric may be combined with deviations from known standard network device configurations and network templates.

FIGS. 9A and 9B illustrates graphs 900A and 900B depicting engineer template variance and technology depth, respectively, compared to company averages, minima, and maxima. Together, graphs 900A and 900B depict the location of an engineer in a hierarchy using deviation from standard network device configurations and technology depth as metrics. The historical standard network device configurations of a user may be evaluated, and the implemented changes may be compared to known standard network device configurations. Groupings and patterns may thereby be established relative to the role the engineer plays in the organization.

FIG. 10 illustrates an example graph 1000 depicting an aggregate grouping of engineering skill within an organization. Engineers may be classified as influencers or implementers by clustering engineering skills based on configuration vocabulary and variation from known standard network device configurations. A large group of change implementers (e.g., NOC engineers) may tend to frequently perform the same tasks over a limited breadth of configuration topics. Meanwhile, the change influencers (e.g., architects, engineers, etc.) may deviate from standard network device configurations, as they are responsible for enablement of features, optimization, and the creation of standard network device configurations that are enforced by other engineers.

The ability to establish a hierarchy and profile of behavior may provide several insertion points into services, including change management early warning; training/learning feedback, talent evaluation, and career progression; and role identification and task-oriented network engineer selection. Turning first to change management early warning, the dictionary of past configuration information associated with an engineer may provide a safety net when performing maintenance windows and non-routine tasks. Profiling may allow for quick identification and prediction of success based on past experience. For example, the top personnel in an organization may be ranked/identified for handling an upcoming change or maintenance window based on the specific tasks that need to be completed.

Training/learning feedback, talent evaluation, and career progression may offer social and account information used in conjunction with past configuration behavior to provide insight into the progression of engineer careers and boost reputations for network change trust. If an engineer has completed certain trainings, or attended knowledge transfer sessions about a particular technology, the dictionary of that engineer may reference those technologies. This historical analysis may also identify areas of weakness or areas for development based on past missteps.

Role identification and task-oriented network engineer selection may also be enabled by identifying the optimal resource for a given task, which may be a natural outcome for such network configuration task profiling. This prescriptive analysis of the level of competency and technologies regularly configured by engineers may also enable a per-technology breakout of network staff and offer insight into the roles engineers have (or should have) based on demonstrated historical proficiency. For example, access levels to certain systems (e.g., a customer experience portal) or devices may be associated with the competency of a given engineer. As an engineer improves and crosses pre-defined thresholds, the corresponding level of access may automatically upgrade. Auto-correlation based on pre-defined thresholds may alleviate the tedious nature of manually adding, removing, and changing access levels.

Techniques described herein may have apply to any suitable area/use case, such as customer experience, software engineering, etc. In one example, code changes made by developers may be analyzed. If the code is basic or often has bugs, this may be captured and a profile of the developer may be provided along with additional insights. Developers with more complex code and fewer bugs in the code may be considered to have higher skill and may be assigned to more difficult and/or more visible projects.

Trust levels may be integrated with orchestration and workflow management software. Because the reputation score may be built on action, and not necessarily titles, orchestration and change management software may benefit from real data of influencer-or-implementer type scenarios when evaluating trust situations. For example, an automated process may consult the reputation before deploying configuration blocks on behalf of a network operator. Furthermore, the creation of a safety net or early warning system may send an alert to a network operator who is about to follow a non-routine course of action.

The identification of existing skills and gaps on a team of network operators may promote learning or training events that directly align with customer gaps and pain points. Service offerings that are aware of customer learning progressions and trainings, in context with configuration and technology history, may provide a pairing that allows for targeted training opportunities.

Techniques described herein may leverage the context of any suitable configuration changes as well as network operator behavior as additional factors to identify common and rare tasks. One example use case may involve detecting whether a network change is in or out of the scope of normal operating behavior for a network engineer based on past performance and reputation. Similarly, safety measures may be implemented for a junior software engineer/developer who is attempting to propose changes in a pull request. If the breadth of the code and patches associated with a developer are evaluated, these techniques may be used to evaluate whether there is a large scale deviation from the past performance and behavior of the engineer. As the software architect evaluates incoming changes to the project, this information may be taken into consideration when deciding whether the patch should go through.

Data which proves that a user executed a change and committed to a given process may indicate that the user followed a thought process and took fewer risks when executing a change. Over time and with repeated success, these user configurations and actions in the real world may establish the expertise of a user.

The behavior analysis described herein may enable customers to understand how a team is performing, as well as the skill level of the team. An automated metric may determine the incoming change compared to the known scope and reputation of a change implementer, which may enable human-assisted review processes and automated machine decisions. As an automation example, a breakpoint may exist between the user or orchestration software and the parser of the operating system of a network device. If the proposed configuration blocks are intercepted at the device level, a point-of-no-return safety net may be supplied to ensure that out-of-scope misconfiguration does not occur. If a junior network engineer accidentally deploys a detrimental configuration block, or is bold in experimentation, the reputation model from the device may analyze the proposed change, before the change is implemented. The analysis may be based on threshold considerations including whether the change should be permitted based on whether that change is within the scope of what would normally be expected from the user. On-box or orchestration solutions may leverage this information as a safety net against misconfiguration.

Figure 11:
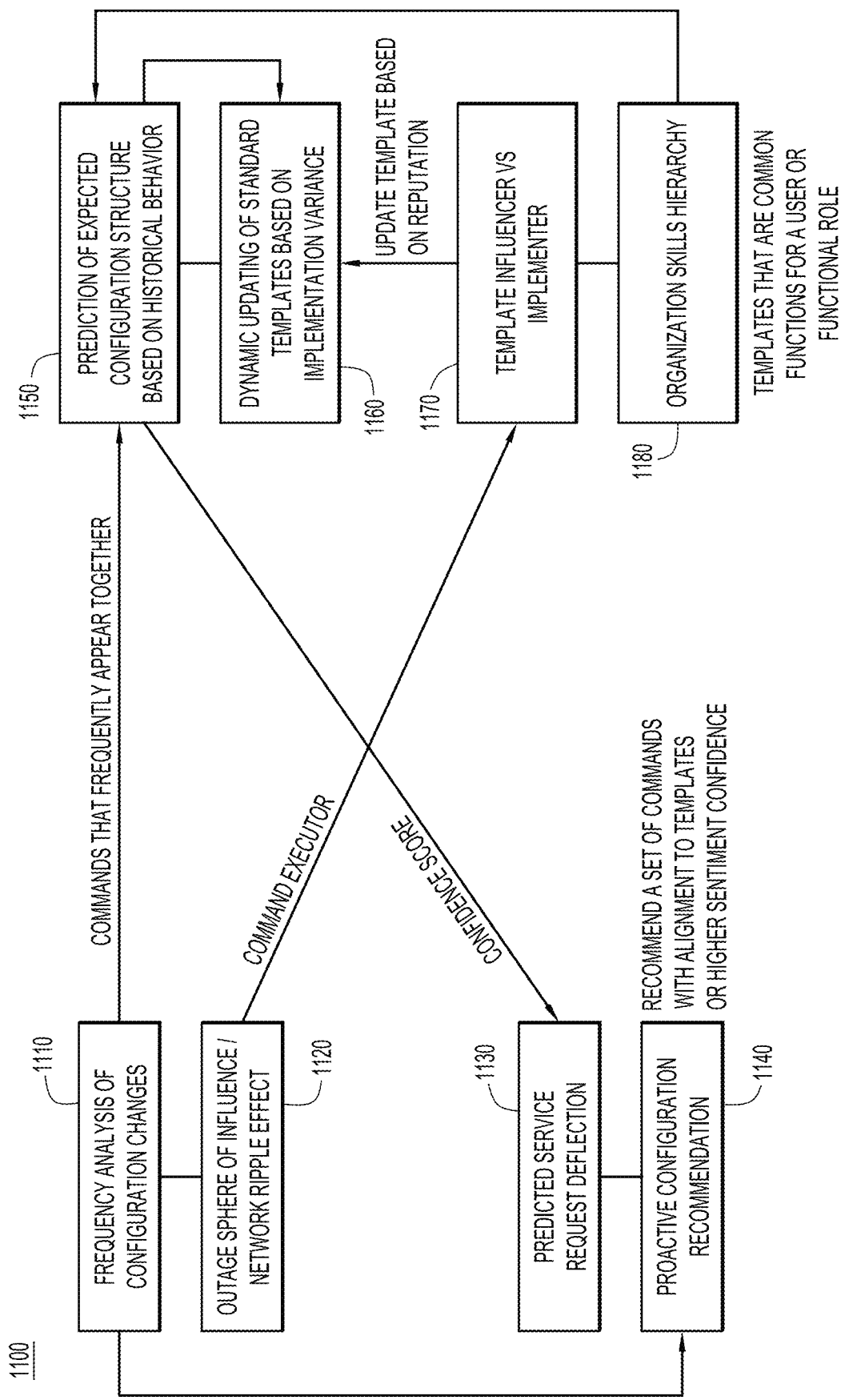
FIG. 11 illustrates a workflow for analyzing network device configurations, according to an example embodiment.
Figure 12:
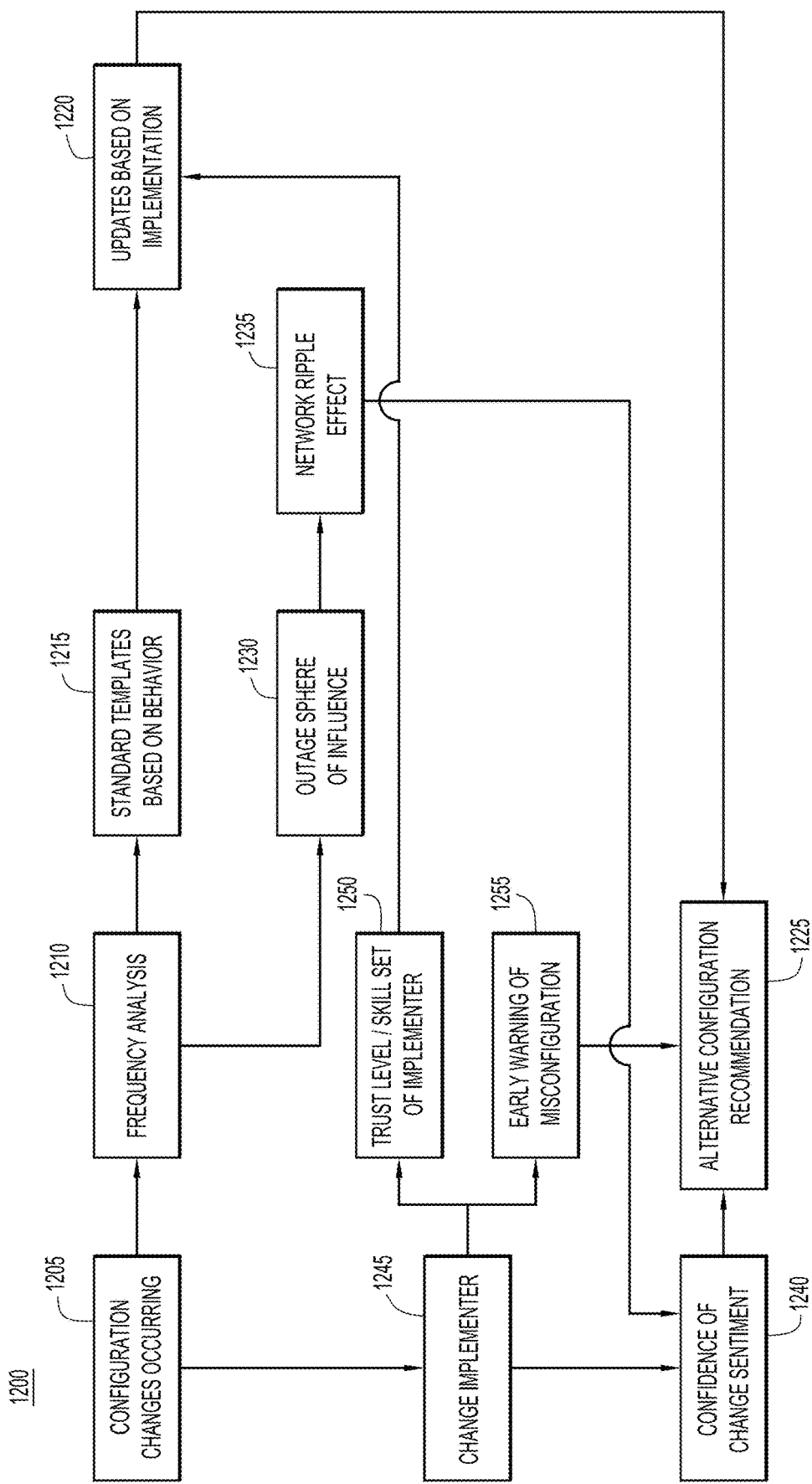
FIG. 12 illustrates another workflow for analyzing network device configurations, according to an example embodiment.

FIGS. 11 and 12 demonstrate an analytics capability that detects configuration changes in network devices, associates themes and templates to network changes, and uses past knowledge of configuration change behavior to predict both sentiment and frequency of proposed change management and maintenance windows. Turning first to FIG. 11, shown is an example workflow 1100 for analyzing network device configurations in accordance with techniques described herein. Aspects 1110-1180 are shown with various interrelationships therebetween. Aspect 1110 corresponds to frequency analysis of configuration changes. Aspect 1120 corresponds to outage sphere of influence/network ripple effect. Aspect 1130 corresponds to predicted service request deflection. Aspect 1140 corresponds to proactive configuration recommendation. Aspect 1150 corresponds to prediction of expected configuration structure based on historical behavior. Aspect 1160 corresponds to dynamic updating of standard templates based on implementation variance. Aspect 1170 corresponds to template influencer versus implementer. Aspect 1180 corresponds to organization skills hierarchy.

Aspect 1130 may use a confidence score that indicates an extent to which a template or collection of configurations will result in positive sentiment, obtained from aspect 1150. Aspect 1140 may recommend a set of commands with alignment to templates or higher sentiment confidence based on input obtained from aspect 1110. Aspect 1150 may use the indication of commands that frequently appear together, obtained from aspect 1110. Aspect 1150 may further also use an indication of which templates are common functions from a user or functional role, obtained from aspect 1180. Aspect 1160 may update templates based on reputation as per input obtained from aspect 1170. Aspect may also obtained input from aspect 1150. Aspect 1170 may use the command executor, obtained from aspect 1110.

FIG. 12 illustrates an example workflow 1200 for analyzing network device configurations in accordance with techniques described herein. Aspect 1205 relates to the occurrence of configuration changes; aspect 1210 to frequency analysis; aspect 1215 to behavior-based standard templates; aspect 1220 to implementation-based updates; aspect 1225 to alternative configuration recommendations; aspect 1230 to the outage sphere of influence; aspect 1235 to the network ripple effect; aspect 1240 to the confidence of change sentiment; aspect 1245 to a change implementer; aspect 1250 to the trust level and/or skill set of the implementer; and aspect 1255 to early warning misconfiguration. As represented by the arrows, respective aspects 1205-1255 may obtain/provide input from/to each other. For example, aspect 1210 (frequency analysis) may be enabled due to an indication of configuration changes obtained from aspect 1205.

Figure 13:
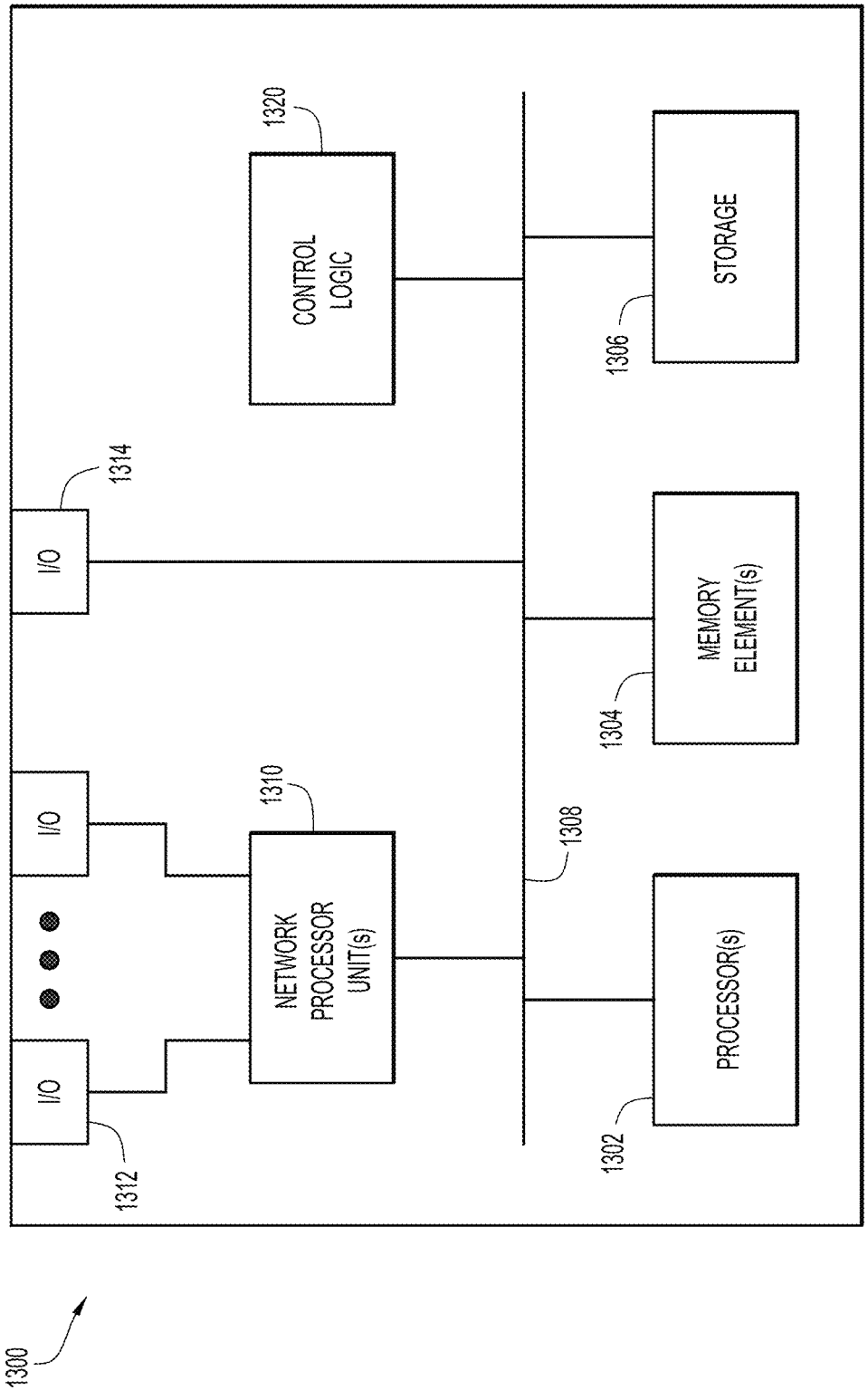
FIG. 13 illustrates a hardware block diagram of a computing device configured to perform functions associated with operations discussed herein, according to an example embodiment.

Referring to FIG. 13, FIG. 13 illustrates a hardware block diagram of a computing device 1300 that may perform functions associated with operations discussed herein in connection with the techniques depicted in FIGS. 1-12. In various embodiments, a computing device, such as computing device 1300 or any combination of computing devices 1300, may be configured as any entity/entities as discussed for the techniques depicted in connection with FIGS. 1-12 in order to perform operations of the various techniques discussed herein.

In at least one embodiment, computing device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with memory elements 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, and/or any other I/O port(s) now known or hereafter developed. Thus, the network processor unit(s) 1310 and/or network I/O interfaces 1312 may include suitable interfaces for receiving, transmitting, and/or otherwise communicating data and/or information in a network environment.

I/O interface(s) 1314 allow for input and output of data and/or information with other entities that may be connected to computing device 1300. For example, I/O interface(s) 1314 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1320 can include instructions that, when executed, cause processor(s) 1302 to perform operations, which can include, but not be limited to, providing overall control operations of computing device 1300; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory elements 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 1300 for transfer onto another computer readable storage medium.

FIG. 14 is a flowchart of an example method 1400 for performing functions associated with operations discussed herein. Method 1400 may be performed by any suitable entity, such as standard configuration generation server 140 or computing device 1300. At operation 1410, one or more groups of network device configuration blocks may be obtained. At operation 1420, an analysis may be performed of the one or more groups of network device configuration blocks including identifying respective frequencies associated with respective network device configuration blocks of the one or more groups of network device configuration blocks. At operation 1430, based on the respective frequencies, one or more network device configuration blocks of the one or more groups of network device configuration blocks may be automatically aggregated into a standard network device configuration.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4 G/5 G/nG, IEEE 802.11 (e.g., Wi-Fi®/Wi-Fi®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: obtaining one or more groups of network device configuration blocks; performing an analysis of the one or more groups of network device configuration blocks including identifying respective frequencies associated with respective network device configuration blocks of the one or more groups of network device configuration blocks; and based on the respective frequencies, automatically aggregating one or more network device configuration blocks of the one or more groups of network device configuration blocks into a standard network device configuration.

In one example, performing the analysis includes: computing a global score for the one or more groups of network device configuration blocks that indicates a likelihood of an aggregate presence of the one or more groups of network device configuration blocks; determining whether the global score is greater than a threshold; and if the global score is less than the threshold, generating an indication of one or more recommended network device configuration blocks based on the analysis of the one or more groups of network device configuration blocks.

In a further example, performing the analysis further includes, for each respective network device configuration block in the one or more groups of network device configuration blocks, computing an individual score that indicates a likelihood of a presence of the respective network device configuration block in the one or more groups of network device configuration blocks; and computing the global score includes computing the global score based on the individual scores for the respective network device configuration blocks.

In one example, the method further comprises: training a machine learning process to perform the analysis of the one or more groups of network device configuration blocks.

In one example, obtaining the one or more groups of network device configuration blocks includes: obtaining command accounting logs.

In one example, the method further comprises: automatically aggregating one or more subsequent network device configuration blocks into a subsequent standard network device configuration; determining whether a change has occurred from the standard network device configuration to the subsequent standard network device configuration; and in response to determining that the change has occurred, replacing the standard network device configuration with the subsequent standard network device configuration.

In a further example, replacing the standard network device configuration with the subsequent standard network device configuration includes: replacing the standard network device configuration with the subsequent standard network device configuration based on a reputation of a user associated with the change.

In another further example, wherein replacing the standard network device configuration with the subsequent standard network device configuration includes: replacing the standard network device configuration with the subsequent standard network device configuration based on a frequency of a detection of a network device configuration block associated with the change.

In one example, automatically aggregating the one or more network device configuration blocks includes: automatically aggregating the one or more network device configuration blocks based on a product family associated with the one or more network device configuration blocks.

In one example, automatically aggregating the one or more network device configuration blocks includes: automatically aggregating the one or more network device configuration blocks based on a function of a network device associated with the one or more network device configuration blocks.

In one example, automatically aggregating the one or more network device configuration blocks includes: automatically aggregating the one or more network device configuration blocks based on software of a network device associated with the one or more network device configuration blocks.

In one example, the method further comprises: automatically configuring a network device based on the standard network device configuration.

In another form, an apparatus is provided. The apparatus comprises: a network interface configured to obtain or provide network communications; and one or more processors coupled to the network interface, wherein the one or more processors are configured to: obtain one or more groups of network device configuration blocks; perform an analysis of the one or more groups of network device configuration blocks including identifying respective frequencies associated with respective network device configuration blocks of the one or more groups of network device configuration blocks; and based on the respective frequencies, automatically aggregate one or more network device configuration blocks of the one or more groups of network device configuration blocks into a standard network device configuration.

In another form, one or more non-transitory computer readable storage media are provided. The non-transitory computer readable storage media are encoded with instructions that, when executed by a processor, cause the processor to: obtain one or more groups of network device configuration blocks; perform an analysis of the one or more groups of network device configuration blocks including identifying respective frequencies associated with respective network device configuration blocks of the one or more groups of network device configuration blocks; and based on the respective frequencies, automatically aggregate one or more network device configuration blocks of the one or more groups of network device configuration blocks into a standard network device configuration.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   automatically aggregating one or more first network device configuration blocks into a first version of a standard network device configuration template for one or more network devices of a first network;

automatically aggregating one or more subsequent network device configuration blocks into a subsequent version of the standard network device configuration template;
determining whether a reputation of a user associated with a change from the first version of the standard network device configuration template for the one or more network devices of the first network to the subsequent version of the standard network device configuration template is greater than or less than a threshold reputation level for permitting changes that affect the standard network device configuration template of the first network;
responsive to determining that the reputation of the user associated with the change is greater than the threshold reputation level, replacing the first version of the standard network device configuration template for the one or more network devices of the first network with the subsequent version of the standard network device configuration template, wherein replacing the first version of the standard network device configuration template for the one or more network devices of the first network with the subsequent version of the standard network device configuration template is based further on a frequency of a detection of a particular subsequent network device configuration block of the one or more subsequent network device configuration blocks associated with the change; and
responsive to determining that the reputation of the user associated with the change is less than the threshold reputation level, implementing one or more safety precautions for the one or more network devices of the first network with respect to the change.

2. The method of claim 1, further comprising:
analyzing a historical variance of the standard network device configuration template; and
replacing the first version of the standard network device configuration template with the subsequent version of the standard network device configuration template based further on the historical variance of the standard network device configuration template.

3. The method of claim 1, further comprising:
identifying respective frequencies associated with respective ones of the one or more first network device configuration blocks; and
automatically aggregating the one or more first network device configuration blocks into the first version of the standard network device configuration template based on the respective frequencies.

4. The method of claim 1, further comprising:
determining the reputation of the user associated with the change based on a role of the user within an organization.

5. The method of claim 1, further comprising:
determining the reputation of the user associated with the change based on service request data relating to the user associated with the change.

6. The method of claim 1, further comprising:
determining the reputation of the user associated with the change based on a configuration history of the user associated with the change.

7. The method of claim 1, further comprising:
determining the reputation of the user associated with the change based on a certification and/or training of the user associated with the change.

8. The method of claim 1, wherein determining whether the reputation of the user associated with the change is greater than or less than the threshold reputation level includes:
categorizing the user associated with the change as one of a change implementer or a change influencer, wherein the change implementer has a lower reputation than the change influencer; and
implementing the one or more safety precautions with respect to the change in response to categorizing the user as the change implementer, or replacing the first version of the standard network device configuration template with the subsequent version of the standard network device configuration template in response to categorizing the user as the change influencer.

9. The method of claim 1, wherein implementing the one or more safety precautions with respect to the change comprises one or more of:
outputting a warning that there is a mismatch between at least one of the one or more first network device configuration blocks of the first version of the standard network device configuration template and at least one of the one or more subsequent network device configuration blocks of the subsequent version of the standard network device configuration template;
recommending an alternative version of the standard network device configuration template or one or more alternative configuration blocks that comply with the standard network device configuration template;
preventing execution of one or more mismatched configuration blocks of the subsequent version with respect to the first version; or
aborting the change to the subsequent version of the standard network device configuration template to avoid misconfiguration.

10. An apparatus comprising:
a network interface configured to obtain or provide network communications; and
one or more processors coupled to the network interface, wherein the one or more processors are configured to:
automatically aggregate one or more first network device configuration blocks into a first version of a standard network device configuration template for one or more network devices of a first network;
automatically aggregate one or more subsequent network device configuration blocks into a subsequent version of the standard network device configuration template;
determine whether a reputation of a user associated with a change from the first version of the standard network device configuration template for the one or more network devices of the first network to the subsequent version of the standard network device configuration template is greater than or less than a threshold reputation level for permitting changes that affect the standard network device configuration template of the first network;
responsive to determining that the reputation of the user associated with the change is greater than the threshold reputation level, replace the first version of the standard network device configuration template for the one or more network devices of the first network with the subsequent version of the standard network device configuration template, wherein replacing the first version of the standard network device configuration template for the one or more network devices of the first network with the subsequent version of the standard network device configuration template is based further on a frequency of a detection of a particular subsequent network device configuration block of the one or more subsequent network device configuration blocks associated with the change; and responsive to determining that the reputation of the user associated with the change is less than the threshold reputation level, implement one or more safety precautions for the one or more network devices of the first network with respect to the change.

11. The apparatus of claim 10, wherein the one or more processors are further configured to:

analyze a historical variance of the standard network device configuration template; and replace the first version of the standard network device configuration template with the subsequent version of the standard network device configuration template based further on the historical variance of the standard network device configuration template.

12. The apparatus of claim 10, wherein the one or more processors are further configured to:

identify respective frequencies associated with respective ones of the one or more first network device configuration blocks; and automatically aggregate the one or more first network device configuration blocks into the first version of the standard network device configuration template based on the respective frequencies.

13. The apparatus of claim 10, wherein the one or more processors are further configured to:

determine the reputation of the user associated with the change based on a role of the user within an organization.

14. The apparatus of claim 10, wherein the one or more processors are further configured to:

determine the reputation of the user associated with the change based on service request data relating to the user associated with the change.

15. The apparatus of claim 10, wherein the one or more processors are further configured to:

determine the reputation of the user associated with the change based on a configuration history of the user associated with the change.

16. The apparatus of claim 10, wherein the one or more processors are further configured to:

determine the reputation of the user associated with the change based on a certification and/or training of the user associated with the change.

17. The apparatus of claim 10, wherein to determine whether the reputation of the user associated with the change is greater than or less than the threshold reputation level the one or more processors are configured to:

categorize the user associated with the change as one of a change implementer or a change influencer, wherein the change implementer has a lower reputation than the change influencer; and implement the one or more safety precautions with respect to the change in response to categorizing the user as the change implementer or replace the first version of the standard network device configuration template with the subsequent version of the standard network device configuration template in response to categorizing the user as the change influencer.

18. One or more non-transitory computer readable storage media encoded with instructions that, when executed by a processor, cause the processor to:

automatically aggregate one or more first network device configuration blocks into a first version of a standard network device configuration template for one or more network devices of a first network;

automatically aggregate one or more subsequent network device configuration blocks into a subsequent version of the standard network device configuration template;

determine whether a reputation of a user associated with a change from the first version of the standard network device configuration template for the one or more network devices of the first network to the subsequent version of the standard network device configuration template is greater than or less than a threshold reputation level for permitting changes that affect the standard network device configuration template of the first network;

responsive to determining that the reputation of the user associated with the change is greater than the threshold reputation level, replace the first version of the standard network device configuration template for the one or more network devices of the first network with the subsequent version of the standard network device configuration template, wherein replacing the first version of the standard network device configuration template for the one or more network devices of the first network with the subsequent version of the standard network device configuration template is based further on a frequency of a detection of a particular subsequent network device configuration block of the one or more subsequent network device configuration blocks associated with the change; and responsive to determining that the reputation of the user associated with the change is less than the threshold reputation level, implement one or more safety precautions for the one or more network devices of the first network with respect to the change.

19. The one or more non-transitory computer readable storage media of claim 18, wherein the instructions further cause the processor to:

analyze a historical variance of the standard network device configuration template; and replace the first version of the standard network device configuration template with the subsequent version of the standard network device configuration template based further on the historical variance of the standard network device configuration template.

20. The one or more non-transitory computer readable storage media of claim 18, wherein the instructions further cause the processor to:

identify respective frequencies associated with respective ones of the one or more first network device configuration blocks; and automatically aggregate the one or more first network device configuration blocks into the first version of the standard network device configuration template based on the respective frequencies.

21. The one or more non-transitory computer readable storage media of claim 18, wherein the instructions cause the processor to:

determine the reputation of the user associated with the change based on one or more of: a role of the user within an organization, service request data relating to the user associated with the change, a configuration history of the user associated with the change, or a certification and/or training of the user associated with the change.

22. The one or more non-transitory computer readable storage media of claim 18, wherein to determine whether the reputation of the user associated with the change is greater than or less than the threshold reputation level the instructions further cause the processor to:
- categorize the user associated with the change as one of a change implementer or a change influencer, wherein the change implementer has a lower reputation than the change influencer; and
- implement the one or more safety precautions with respect to the change in response to categorizing the user as the change implementer or replace the first version of the standard network device configuration template with the subsequent version of the standard network device configuration template in response to categorizing the user as the change influencer.

* * * * *